US011641440B2

United States Patent
Agrawal et al.

(10) Patent No.: US 11,641,440 B2
(45) Date of Patent: May 2, 2023

(54) VIDEO CONTENT BASED ON MULTIPLE CAPTURE DEVICES

(71) Applicant: Motorola Mobility LLC, Chicago, IL (US)

(72) Inventors: Amit Kumar Agrawal, Bangalore (IN); Rahul Bharat Desai, Hoffman Estates, IL (US); William Ryan, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/473,384

(22) Filed: Sep. 13, 2021

(65) Prior Publication Data

US 2023/0085250 A1 Mar. 16, 2023

(51) Int. Cl.
| | |
|---|---|
| *H04N 5/232* | (2006.01) |
| *H04N 7/14* | (2006.01) |
| *H04N 5/272* | (2006.01) |
| *H04N 5/265* | (2006.01) |
| *H04N 9/73* | (2023.01) |
| *G06V 20/40* | (2022.01) |
| *H04N 23/611* | (2023.01) |

(52) U.S. Cl.
CPC ............. *H04N 5/272* (2013.01); *G06V 20/46* (2022.01); *H04N 5/265* (2013.01); *H04N 9/73* (2013.01); *H04N 23/611* (2023.01)

(58) Field of Classification Search
CPC ................................ H04N 23/64; H04N 7/144
USPC ..................................................... 348/333.02
See application file for complete search history.

(56) References Cited

U.S. PATENT DOCUMENTS

| | | | |
|---|---|---|---|
| 9,491,374 B1 * | 11/2016 | Avrahami | ............... H04N 7/147 |
| 10,147,141 B1 | 12/2018 | Rixford | |
| 10,387,098 B2 | 8/2019 | Park et al. | |
| 10,531,039 B1 * | 1/2020 | Bender | ............... G10L 21/0272 |
| 10,554,921 B1 * | 2/2020 | Lim | .......................... H04N 7/15 |
| 11,583,760 B1 | 2/2023 | Agrawal et al. | |
| 2006/0112349 A1 | 5/2006 | Clow et al. | |
| 2007/0101293 A1 | 5/2007 | Cherry et al. | |
| 2007/0112926 A1 | 5/2007 | Brett et al. | |
| 2007/0124507 A1 | 5/2007 | Gurram et al. | |
| 2008/0250408 A1 | 10/2008 | Tsui et al. | |
| 2009/0204881 A1 | 8/2009 | Murthy et al. | |

(Continued)

OTHER PUBLICATIONS

"Auto Hotspot, How to | Samsung Galaxy S10 Plus", YouTube Video uploaded by Omarr Ghafoor [online][retrieved Jun. 23, 2021], Retrieved from the Internet <https://www.youtube.com/watch?v=2V6s31zA7p4>., Oct. 30, 2019, 4 Pages.

(Continued)

*Primary Examiner* — Anthony J Daniels
(74) *Attorney, Agent, or Firm* — FIG. 1 Patents

(57) ABSTRACT

Techniques for video content based on multiple capture devices are described and are implementable to enable multiple video capture devices to be utilized for a video feed. Generally, the described implementations enable video content captured by multiple video capture devices to be utilized, such as to integrate different instances of video content into a merged video content stream. In at least one implementation this provides higher quality video attributes to be utilized than is provided by utilizing a single video content source.

20 Claims, 16 Drawing Sheets

(56) References Cited

U.S. PATENT DOCUMENTS

| | | | |
|---|---|---|---|
| 2012/0050183 A1 | 3/2012 | Lee | |
| 2012/0226742 A1 | 9/2012 | Momchilov et al. | |
| 2014/0006634 A1 | 1/2014 | Eacott et al. | |
| 2014/0098038 A1 | 4/2014 | Paek et al. | |
| 2014/0192137 A1* | 7/2014 | Kim | H04N 7/141 |
| | | | 348/14.07 |
| 2014/0277843 A1 | 9/2014 | Langlois et al. | |
| 2014/0320398 A1 | 10/2014 | Papstein | |
| 2014/0349757 A1 | 11/2014 | Nogami et al. | |
| 2016/0210011 A1 | 7/2016 | Ho | |
| 2016/0283063 A1 | 9/2016 | Missig et al. | |
| 2017/0078428 A1 | 3/2017 | Unter Ecker | |
| 2017/0277498 A1 | 9/2017 | Wood, Jr. et al. | |
| 2019/0156788 A1 | 5/2019 | Lee et al. | |
| 2019/0182113 A1 | 6/2019 | Alam et al. | |
| 2019/0294268 A1 | 9/2019 | Koyama et al. | |
| 2019/0378519 A1 | 12/2019 | Dunjic et al. | |
| 2020/0356243 A1 | 11/2020 | Meyer et al. | |
| 2020/0356254 A1 | 11/2020 | Missig et al. | |
| 2021/0097208 A1 | 4/2021 | Donahue et al. | |
| 2021/0181922 A1 | 6/2021 | Chang et al. | |
| 2021/0248483 A1 | 8/2021 | Tomasik et al. | |
| 2021/0349627 A1 | 11/2021 | Chang et al. | |
| 2022/0070371 A1* | 3/2022 | Bushman | H04N 7/147 |
| 2022/0070389 A1* | 3/2022 | Tangeland | H04N 5/272 |
| 2023/0041046 A1 | 2/2023 | Agrawal et al. | |
| 2023/0045005 A1 | 2/2023 | Meirhaeghe et al. | |
| 2023/0063665 A1 | 3/2023 | Snow et al. | |

OTHER PUBLICATIONS

"Do you know about Auto Hotspot?", Samsung [retrieved Jun. 23, 2021], Retrieved from the Internet <https://r2.community.samsung.com/t5/Tech-Talk/Do-you-know-about-Auto-Hotspot/td-p/2967111>., Dec. 4, 2019, 5 Pages.

"How do you automatically activate Mobile hotspot via Bluetooth connection on Windows 10 Mobile?", in: Windows Central Forums [online][retrieved Jul. 12, 2021], Retrieved from the Internet <https://forums.windowscentral.com/ask-question/452584-how-do-you-automatically-activate-mobile-hotspot-via-bluetooth-connection-windows-10-mobile.html>., Feb. 19, 2017, 11 Pages.

"Instant Hotspot on your Mac", Apple Inc. [retrieved Jun. 23, 2021], Retrieved from the Internet <https://support.apple.com/guide/macbook-air/instant-hotspot-apdae69c81f1/mac>., Feb. 2019, 2 Pages.

"Setting up Auto Hotspot on my Samsung phone", Samsung [retrieved Jun. 23, 2021], Retrieved from the Internet <https://www.samsung.com/au/support/mobile-devices/setup-auto-hotspot/>., Oct. 20, 2020, 8 Pages.

Pratik, "How to Use Your Phone as a Drawing Pad for PC", TechWiserBlog [online][retrieved Jun. 8, 2021], Retrieved from the Internet <https://techwiser.com/use-phone-as-drawing-pad-for-pc/>., Jul. 15, 2020, 12 pages.

Bohn, Dieter, "Chromebook Instant Tethering expands beyond Google devices and phones", The Verge Blog, Vox Media, LLC. [online][retrieved Jun. 23, 2021], Retrieved from the Internet <https://www.theverge.com/2019/2/4/18210378/chromebook-instant-tethering-android-mobile-hotspot-chrome-os-expansion>., Feb. 4, 2019, 6 Pages.

Cipriani, Jason, "Howto use Apple's Instant Hotspot feature", CNET [online][retrieved Jun. 23, 2021], Retrieved from the Internet <https://www.cnet.com/how-to/how-to-use-apples-instant-hotspot-feature/>., Feb. 7, 2019, 4 Pages.

Heinisch, Christian, "HotSpot Automatic (free)", Google Play [retrieved Jul. 12, 2021], Retrieved from the Internet <https://play.google.com/store/apps/details?id=de.christian_heinisch.hotspot.enablehotspot&hl=en_US&gl=US>., Jun. 7, 2018, 3 Pages.

Russell, Brandon, "Galaxy S21 features wireless support for Samsung DeX on PC", XDA Developers Blog [online][retrieved Jun. 8, 2021], Retrieved from the Internet <https://www.xda-developers.com/galaxy-s21-wireless-support-samsung-dex-on-pc/>., Feb. 5, 2021, 7 pages.

U.S. Appl. No. 17/395,405, "Final Office Action", U.S. Appl. No. 17/395,405, filed Jun. 22, 2022, 38 pages.

U.S. Appl. No. 17/397,002, "Non-Final Office Action", U.S. Appl. No. 17/397,002, filed Aug. 3, 2022, 25 pages.

Tappert, Charles C, et al., "Chapter 6—English Language Handwriting Recognition Interfaces", In: Text Entry Systems: Mobility, Accessibility, Universality, Morgan Kaugmann [retrieved Jun. 27, 2022]. Retrieved from the Internet <https://doi.org/10.1016/B978-012373591-1/50006-1>, 2007, pp. 123-137.

"Non-Final Office Action", U.S. Appl. No. 17/395,405, filed Dec. 27, 2021, 21 pages.

Agrawal, Amit Kumar et al., "U.S. Application as Filed", U.S. Appl. No. 17/473,384, filed Sep. 13, 2021, 68 pages.

Agrawal, Amit Kumar et al., "U.S. Application as Filed", U.S. Appl. No. 17/397,002, filed Aug. 9, 2021, 82 pages.

Desai, Rahul B. et al., "U.S. Application as Filed", U.S. Appl. No. 17/462,281, filed Aug. 31, 2021, 57 pages.

Meirhaeghe, Olivier D. et al., "U.S. Application as Filed", U.S. Appl. No. 17/395,405, filed Aug. 5, 2021, 80 pages.

Snow, Jeffrey T. et al., "U.S. Application as Filed", U.S. Appl. No. 17/473,312, filed Sep. 13, 2021, 48 pages.

U.S. Appl. No. 17/395,405, "Non-Final Office Action", U.S. Appl. No. 17/395,405, filed Oct. 28, 2022, 39 pages.

U.S. Appl. No. 17/397,002, "Notice of Allowance", U.S. Appl. No. 17/397,002, filed Nov. 16, 2022, 9 pages.

U.S. Appl. No. 17/397,002, "Supplemental Notice of Allowability", U.S. Appl. No. 17/397,002, filed Jan. 19, 2023, 3 pages.

"Combined Search and Examination Report", GB Application No. GB2210269.3, dated Feb. 27, 2023, 9 pages.

* cited by examiner

VIDEO CONTENT BASED ON MULTIPLE CAPTURE DEVICES

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Many people have access to multiple different devices and use of a particular device depends on the person's current status, such as on the go, in the office, at home, and so forth. Some device form factors, however, are more conducive to certain tasks than others. For instance, for video-related tasks such as videoconferencing, larger form factor devices such as laptops and desktops are typically preferable due to greater screen space than smaller form factor devices such as smartphones. However, larger form factor devices typically include camera capabilities that are suboptimal and thus result in less than desirable video capture quality.

BRIEF DESCRIPTION OF THE DRAWINGS

Aspects of video content based on multiple capture devices are described with reference to the following Figures. The same numbers may be used throughout to reference similar features and components that are shown in the Figures.

DETAILED DESCRIPTION

Figure 1:
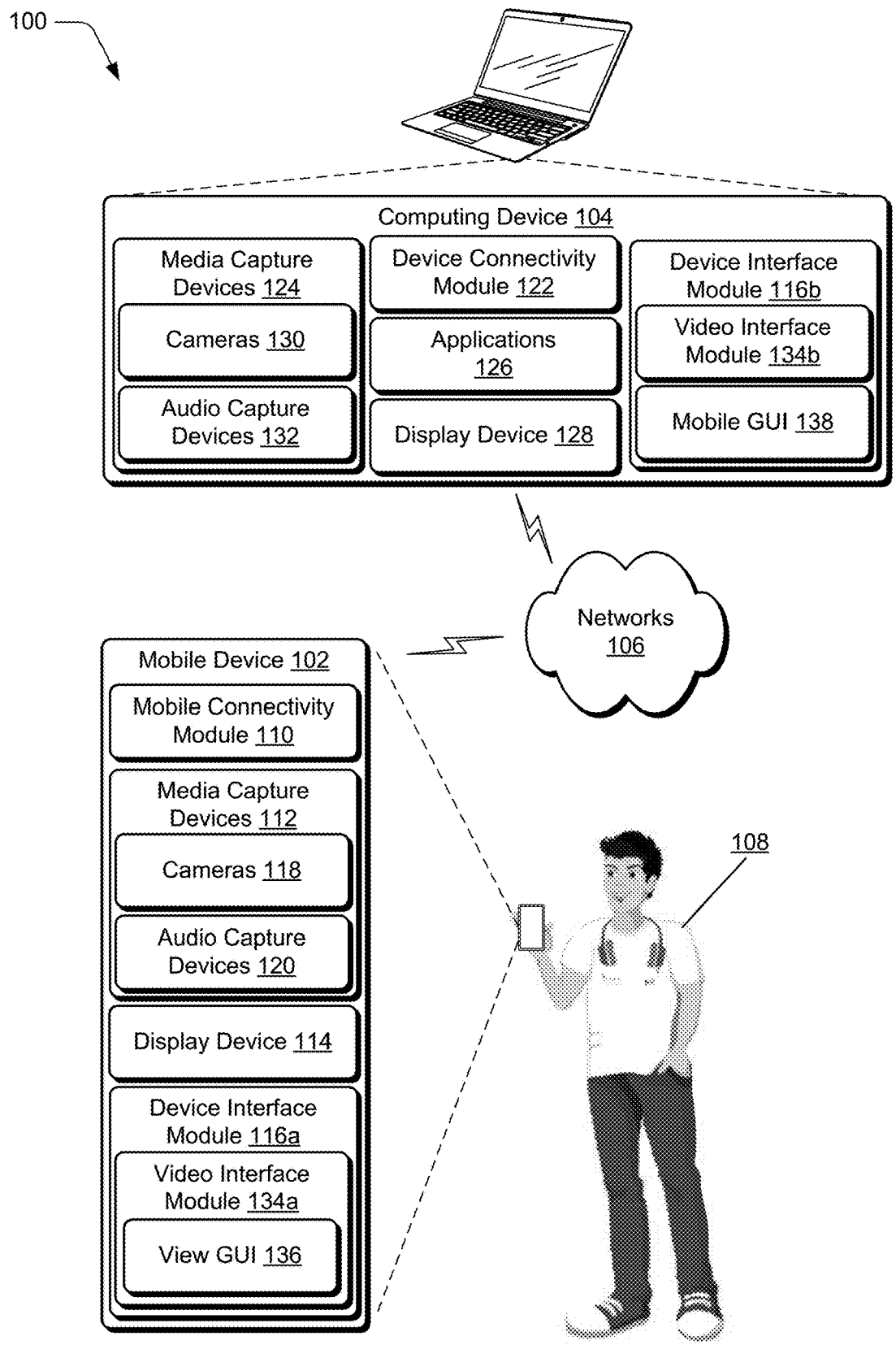
FIG. 1 illustrates an example environment in which aspects of video content based on multiple capture devices can be implemented.

Techniques for video content based on multiple capture devices are described and are implementable to enable multiple video capture devices to be utilized for a video feed. Generally, the described implementations enable video content captured by multiple video capture devices to be utilized, such as to integrate different instances of video content into a merged video content stream. In at least one implementation this provides higher quality video attributes to be utilized than are provided by utilizing a single video content source.

According to various implementations, a mobile device (e.g., a smartphone) and a computing device (e.g., a laptop, a desktop) interface to enable video content captured by the mobile device to be communicated to the computing device. For instance, the mobile device and the computing device are positioned in proximity to one another in a particular physical environment, such as an office. The mobile device captures first video content of a visual scene within the physical environment and communicates the first video content to the computing device. Further, the computing device captures second video content of a visual scene within the physical environment. Visual features of the first video content and the second video content are extractable to generate different sets of extracted visual features. The sets of extracted visual features are then mergeable to generate integrated video content, e.g., a single integrated video feed that includes extracted visual features from the first video content and the second video content.

Consider, for instance, that a user at a particular location leverages a computing device to invoke an application that utilizes video content, such as video communication application. In conventional scenarios video content captured by a camera of the computing is utilized for the application. Utilizing techniques described herein, however, a mobile device in proximity to the computing device captures video content that is provided to the computing device and is usable to provide video content for the application. For instance, the mobile device captures first video content from a particular visual perspective and that includes various visual features such as human features of the user (e.g., a face, a torso, etc.) as well as background features of the particular location. Further, the computing device captures second video content from its own visual perspective and that includes various visual features such as human features of the user and background features.

Accordingly, to provide video content to the application, different sets of visual features are extracted from the different video content. For instance, background visual features are extracted from the first video content captured by the mobile device. Further, human visual features are extracted from the second video content captured by the computing device. The human visual features and the background visual features are mergeable to generate a single video feed, such as by integrating (e.g., overlaying) the human visual features with the background visual features to generate integrated video content. The integrated video content is then provided as a video feed to the application. In at least one implementation this leverages the visual perspective of the user captured by the computing device. For instance, the user is interacting with the computing device and thus the user's gaze is accurately captured by the computing device. Further, the mobile device is able to capture high-quality video of background visual features, such as based on superior camera capabilities of the mobile device in comparison with the computing device. Thus, the merged video content includes accurate user gaze depiction along with high-quality video of background visual features.

In at least one implementation user guidance is provided to enable a mobile device to be correctly positioned relative to a computing device such that video content captured by both devices is accurately mergeable. For instance, in a scenario where a mobile device is in proximity to a computing device and the mobile device is operable to provide video content to the mobile device, implementations determine whether a visual perspective of the mobile device matches a visual perspective of the computing device. In scenarios where the visual perspective of the mobile device deviates from the visual perspective of the computing device, implementations provide user guidance for repositioning the mobile device such that the visual perspectives of the respective devices match. Generally, this enables a more accurate depiction of a visual scene when integrating visual features captured by the mobile device and the computing device.

In at least one implementation, in a scenario where a mobile device and a computing device are positioned in proximity to one another, user gaze detection is utilized to determine how to utilize video content captured by the respective devices. For instance, consider that a user is interacting with an application executing on the computing device, such as a video communication application. As part of interacting with the application the user is viewing a display device of the computing device and thus the user's gaze is directed at the display device. Further, the mobile device is in proximity to the computing device and is able to capture a perspective of the user's gaze. Accordingly, the user's gaze captured by the mobile device is compared to the user's gaze captured by the computing device to determine if the captured user gaze matches between the devices. In at least one implementation, if the user gaze captured by the mobile device matches the user gaze captured by the computing device, video content captured by the mobile device is utilized for a video feed instead of margined the video content with video content captured by the computing device. Generally, this enables advanced video capture technology of the mobile device to be utilized for a video feed without requiring visual feature integration to be performed using different video feeds.

Accordingly, the techniques described herein provide for high-quality video content in scenarios where multiple video capture devices are available.

While features and concepts of video content based on multiple capture devices can be implemented in any number of environments and/or configurations, aspects of video content based on multiple capture devices are described in the context of the following example systems, devices, and methods.

FIG. 1 illustrates an example environment 100 in which aspects of video content based on multiple capture devices can be implemented. The environment 100 includes a mobile device 102 and a computing device 104 that are interconnectable via a network 106. In this particular example, the mobile device 102 represents a portable device that can be carried by a user 108, such as a smartphone or a tablet device. Further, the computing device 104 represents a device such as a laptop computer, a desktop computer, and so forth. These examples are not to be construed as limiting, however, and the mobile device 102 and/or the computing device 104 can be implemented in a variety of different ways and form factors. Example attributes of the mobile device 102 and the computing device 104 are discussed below with reference to the device 1500 of FIG. 15.

The mobile device 102 includes various functionality that enables the mobile device 102 to perform different aspects of video content based on multiple capture devices discussed herein, including a mobile connectivity module 110, media capture devices 112, a display device 114, and a device interface module 116a. The mobile connectivity module 110 represents functionality (e.g., logic and hardware) for enabling the mobile device 102 to interconnect with other devices and/or networks, such as the computing device 104 and the network 106. The mobile connectivity module 110, for instance, enables wireless and/or wired connectivity of the mobile device 102.

The media capture devices 112 are representative of functionality to enable various types of media to be captured via the mobile device 102, such as visual media and audio media. In this particular example the media capture devices 112 include cameras 118 and audio capture devices 120. The media capture devices 112, however, can include a variety of other devices that are able to capture various types of media in accordance with the implementations discussed herein. Generally, the media capture devices 112 include not only hardware for capturing associated media but also logic (e.g., drivers, firmware, etc.) for operating and configuring operation of the associated media capture devices 112. The display device 114 represents functionality (e.g., hardware and logic) for enabling video output via the mobile device 102.

The device interface module 116a represents functionality for enabling the mobile device 102 to interface with other devices. As further detail below, for instance, the device interface module 116a enables the mobile device 102 to establish wireless and/or wired data communication with other devices, e.g., the computing device 104.

The computing device 104 includes various functionality that enables the computing device 104 to perform different aspects of video content based on multiple capture devices discussed herein, including a device connectivity module 122, media capture devices 124, applications 126, a display device 128, and a device interface module 116b. The device connectivity module 122 represents functionality (e.g., logic and hardware) for enabling the computing device 104 to interconnect with other devices and/or networks, such as the mobile device 102 and the network 106. The device connectivity module 122, for instance, enables wireless and/or wired connectivity of the computing device 104. Generally, the computing device 104 and the mobile device 102 are configured to intercommunicate via a variety of different wireless protocols, such as wireless cellular (e.g., 3G, 4G, 5G), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth. In a wireless scenario, for instance, the computing device 104 and the mobile device 102 are able to interconnect via network connectivity (e.g., via the network 106) and/or via direct device-to-device wireless connectivity.

The media capture devices 124 are representative of functionality to enable various types of media to be captured via the computing device 104, such as visual media and audio media. In this particular example the media capture devices 124 include cameras 130 and audio capture devices 132. The media capture devices 124, however, can include a variety of other devices that are able to capture various types of media in accordance with the implementations discussed herein. Generally, the media capture devices 124 include not only hardware for capturing associated media but also logic (e.g., drivers, firmware, etc.) for operating and configuring operation of the associated media capture devices 124.

The applications 126 represent functionality for performing different computing tasks via the computing device 104, such as communication tasks (e.g., videoconferencing), productivity tasks (e.g., word processing, content generation, data analysis, etc.), web browsing, and so forth. The device interface module 116b is representative of functionality for enabling the computing device 104 to interface with other devices. For instance, the device interface module 116b interfaces with the device interface module 116a of the mobile device 102 to enable collaborative data communication between the computing device 104 and the mobile device 102.

According to implementations for video content based on multiple capture devices, for example, the device interface module 116a of the mobile device 102 includes a video interface module 134a that interfaces with a video interface module 134b of the device interface module 116b to enable the mobile device 102 to be utilized as a video input device for the computing device 104. For instance, and as detailed below, video captured by a camera 118 of the mobile device 102 is communicated via the video interface module 134a to the video interface module 134b and utilized for providing video input to the computing device 104. To enable video captured by the mobile device 102 to be utilized by the computing device 104, the video interface module 134a exposes a view graphical user interface (GUI) 136 that is displayed on the display device 114 and that enables various video capture parameters for the mobile device 102 to be configured to optimize video content communicated to the computing device 104. Further, the device interface module 116b exposes a mobile GUI 138 that is configured to output content from the mobile device 102 and configure parameters for communication between the mobile device 102 and the computing device 104. In at least one implementation the device interface module 116b utilizes the mobile GUI 138 to provide screen mirroring from the display device 114 of the mobile device 102.

Having discussed an example environment in which the disclosed techniques can be performed, consider now some example scenarios and implementation details for implementing the disclosed techniques.

Figure 2:
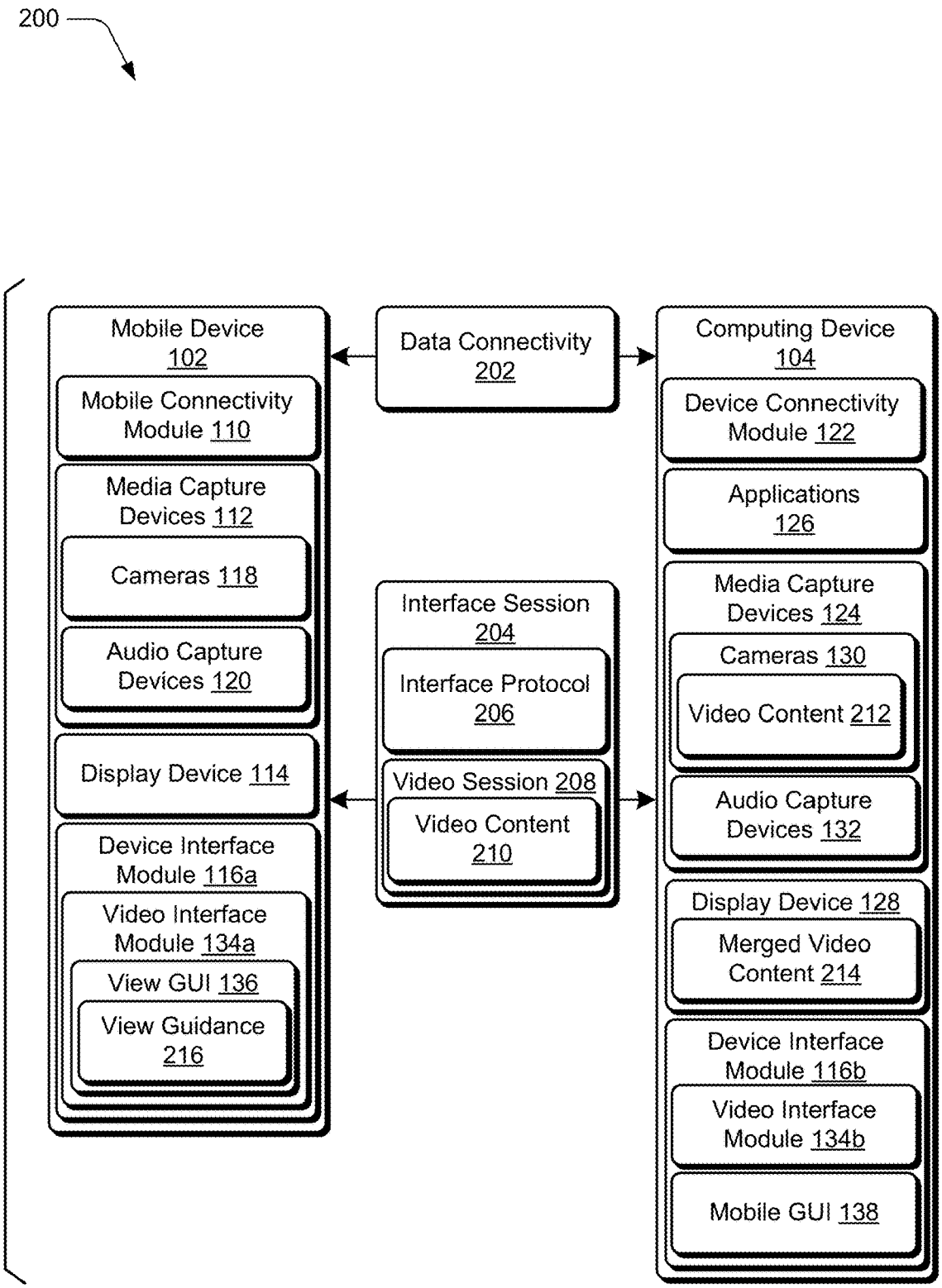
FIG. 2 depicts an example system for enabling video content to be exchanged between devices based in accordance with one or more implementations.

FIG. 2 depicts an example system 200 for enabling video content to be exchanged between devices based in accordance with one or more implementations. Generally, the system 200 can be implemented in the environment 100 and incorporates attributes of the environment 100 introduced above.

In the system 200 the mobile connectivity module 110 and the device connectivity module 122 interface to establish data connectivity 202 between the mobile device 102 and the computing device 104. Generally, the data connectivity 202 is implemented via wireless and/or wired connectivity between the mobile device 102 and the computing device 104 for exchanging data between the devices. The data connectivity 202, for instance, is implemented via direct wireless and/or wired connectivity between the mobile device 102 and the computing device 104, and/or via data communication over the network 106 between the mobile device 102 and the computing device 104. In a wireless scenario the data connectivity 202 can be established as direct device-to-device connectivity between the mobile device 102 and the computing device 104 and utilizing any suitable wireless protocol, such as Wi-Fi Direct, Bluetooth™ (including Bluetooth™ Low Energy (BLE), ultra-wideband (UWB), Near Field Communication (NFC)), LTE direct, NR sidelink, and so forth.

Utilizing the data connectivity 202 the device interface module 116a of the mobile device 102 and the device interface module 116b of the computing device 104 intercommunicate to establish an interface session 204. Generally, the interface session 204 represents an exchange of data between the device interface modules 116a, 116b and is implemented according to an interface protocol 206. The interface protocol 206, for example, specifies a form in which data is to be communicated as part of the interface session 204.

Further to the system 200 and utilizing the interface session 204 and the interface protocol 206, a video session 208 is established between the mobile device 102 and the computing device 104. The video session 208 can be established in response to various events, such as user input to instruct that video content captured at the mobile device 102 is to be communicated to the computing device 104, a request from the video interface module 134b to the video interface module 134a for video content, a request from an application 126 for video content, and so forth. Generally, as part of the video session 208, video content 210 captured by a camera 118 of the mobile device 102 is communicated to the computing device 104. Further, video content 212 is captured by a camera 130 of the computing device 104, and the video content 210 and the video content 212 are combined to generate merged video content 214 that is output via the display device 128. As further described below, for instance, the video interface module 134b integrates features of the video content 210 and the video content 212 to generate the merged video content 214 as an integrated video feed for output.

In at least one implementation, in conjunction with (e.g., during and/or prior to) the video session 208 the video interface module 134a of the mobile device 102 exposes the view GUI 136 and provides view guidance 216 for positioning the mobile device 102 to capture the video content 210. The view guidance 216, for instance, includes information that enables a user to physically position the mobile device 102 in an optimal position for capturing the video content 210.

Figure 3:
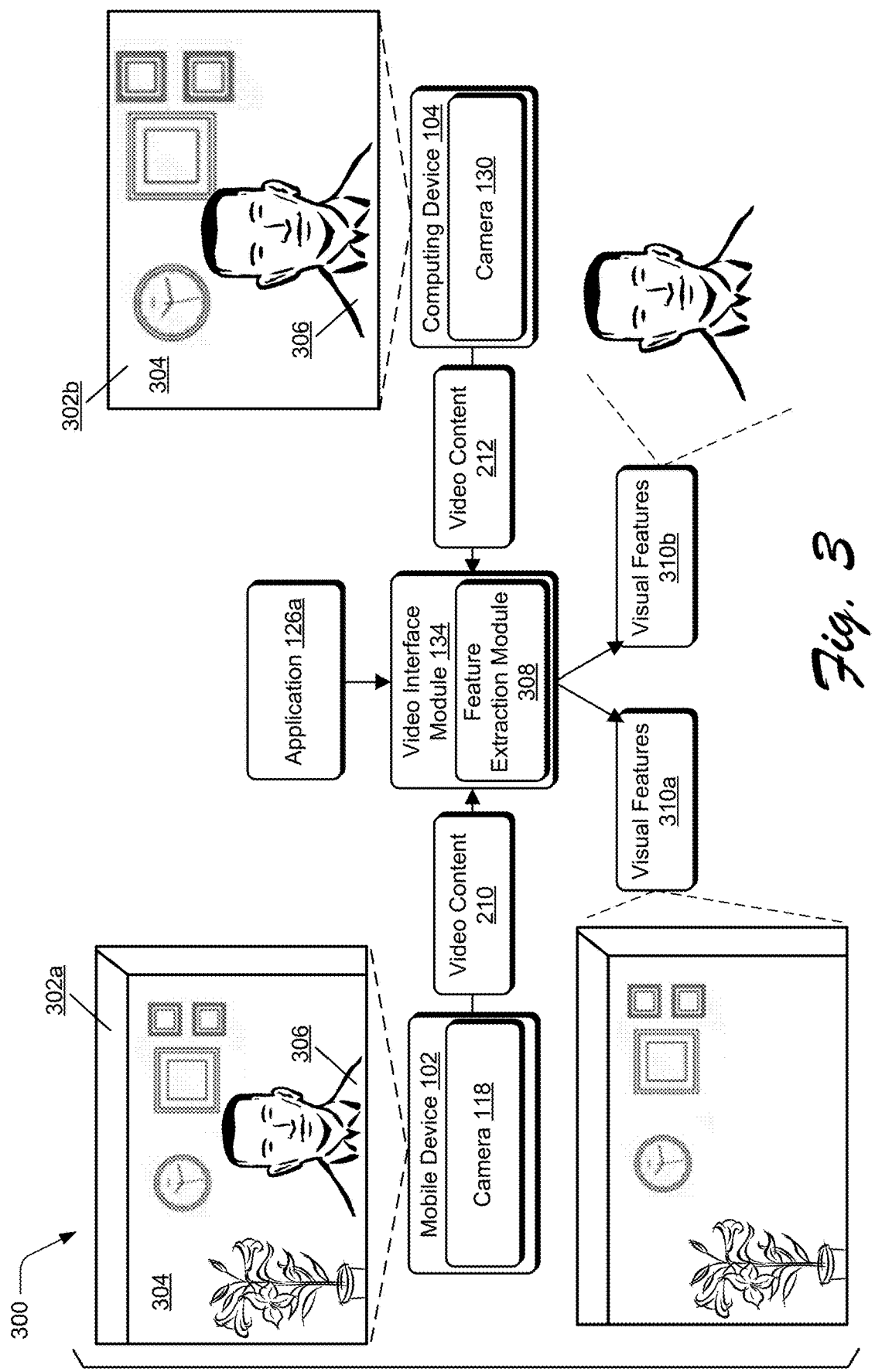
FIG. 3 depicts a scenario for integrating video features from different video instances of video content in accordance with one or more implementations.

FIG. 3 depicts a scenario 300 for integrating video features from different video instances of video content in accordance with one or more implementations. In the scenario 300 the mobile device 102 utilizes a camera 118 to capture the video content 210. The video content 210, for instance, represents live video captured of a scene 302a. Generally, the scene 302a represents a physical environment 304 (e.g., a room) in which a user 306 is positioned. Further, the computing device 104 utilizes a camera 130 to capture video content 212. The video content 212, for instance, represents live video captured of a scene 302b. The scene 302b, for example, represents the same physical environment as the scene 302a in which the user 306 is positioned. Generally, the scenes 302a, 302b represent different visual perspectives of the physical environment 304, such as based on different positioning of the camera 118 relative to the camera 130. In at least one implementation, the video content 210 and the video content 212 are captured for an application 126a, such as a video feed for the application 126a.

Further to the scenario 300 the video interface module 134 implements a feature extraction module 308 to recognize and extract visual features from the video content 210, 212. The video interface module 134, for example, represents an instance of the video interface module 134a and/or the video interface module 134b. Accordingly, the feature extraction module 308 extracts visual features 310a from the video content 210 and visual features 310b from the video content 212. Generally, the feature extraction module 308 utilizes any suitable implementation of image recognition and extraction algorithms that apply feature recognition techniques to recognize visual objects present in the video content 210, 212.

In this particular example the visual features 310a include environmental (e.g., background) features of the physical environment 304 and the visual features 310b include visual features of the user 306. The visual features 310b, for example, include human features detected from the physical environment 304. In at least one implementation the video interface module 134 utilizes feature recognition of the visual features 310b to recognize an identity of the user 306, such as based on known visual features (e.g., facial features and/or other bodily features) for a user of the mobile device 102 and/or the computing device 104.

Figure 4:
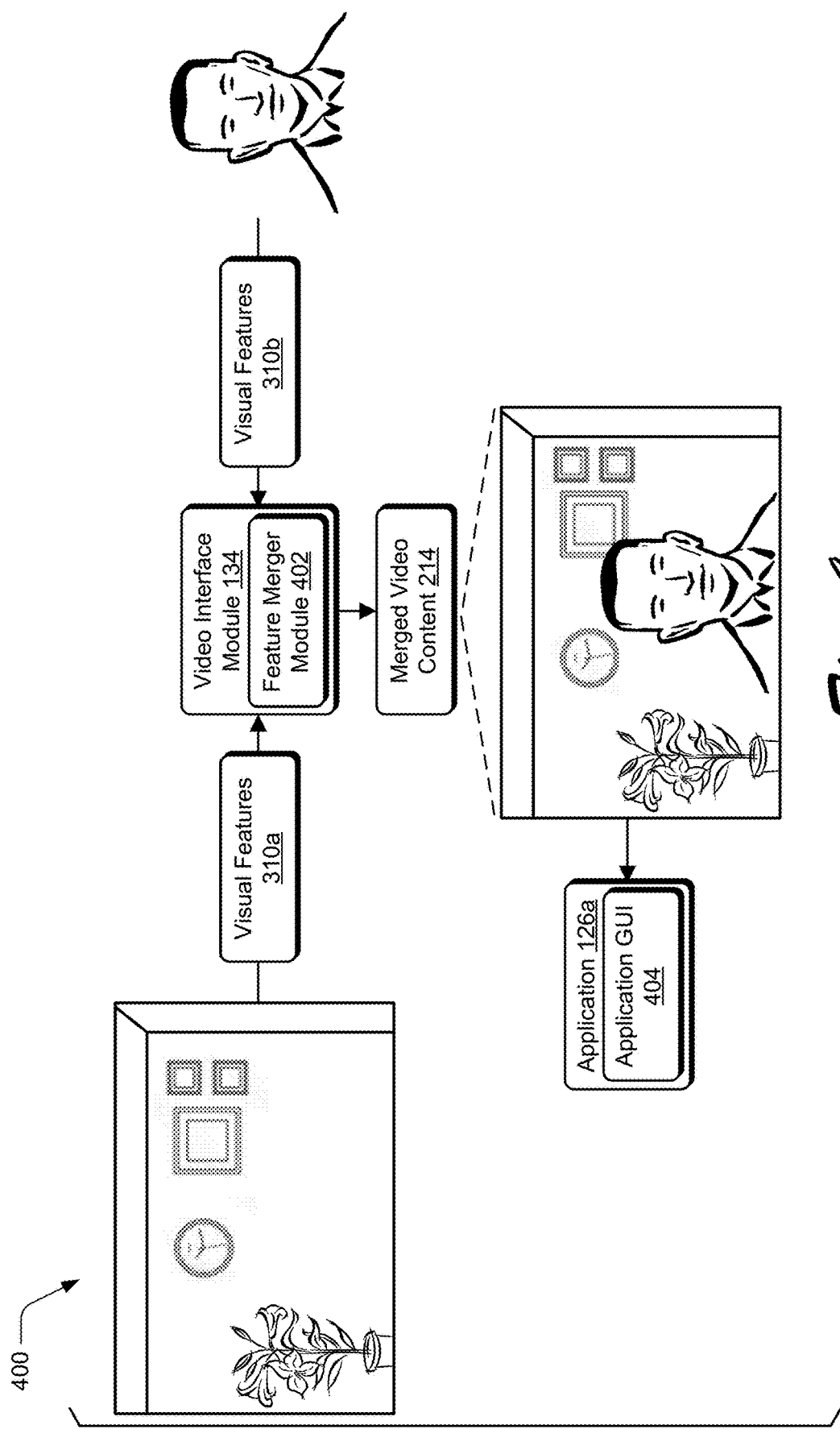
FIG. 4 depicts a scenario for merging extracted visual features in accordance with one or more implementations.

FIG. 4 depicts a scenario 400 for merging extracted visual features in accordance with one or more implementations. The scenario 400, for example, represents a continuation of the scenario 300. In the scenario 400 a feature merger module 402 of the video interface module 134 takes the visual features 310a, 310b as input and merges the features to generate the merged video content 214. The merged video content 214, for example, integrates the background images from the scene 302a captured in the visual features 310a with the user images captured from the scene 302b captured in the visual features 310b. In at least one implementation the merged video content 214 is utilized as a video feed for the application 126a, such as a live, real-time video feed that utilizes the video content 210, 212 to generate a merged live video feed utilizing the merged video content 214. The application 126a, for example, exposes an application GUI 404 and the merged video content 214 is displayed via the application GUI 404.

Figure 5:
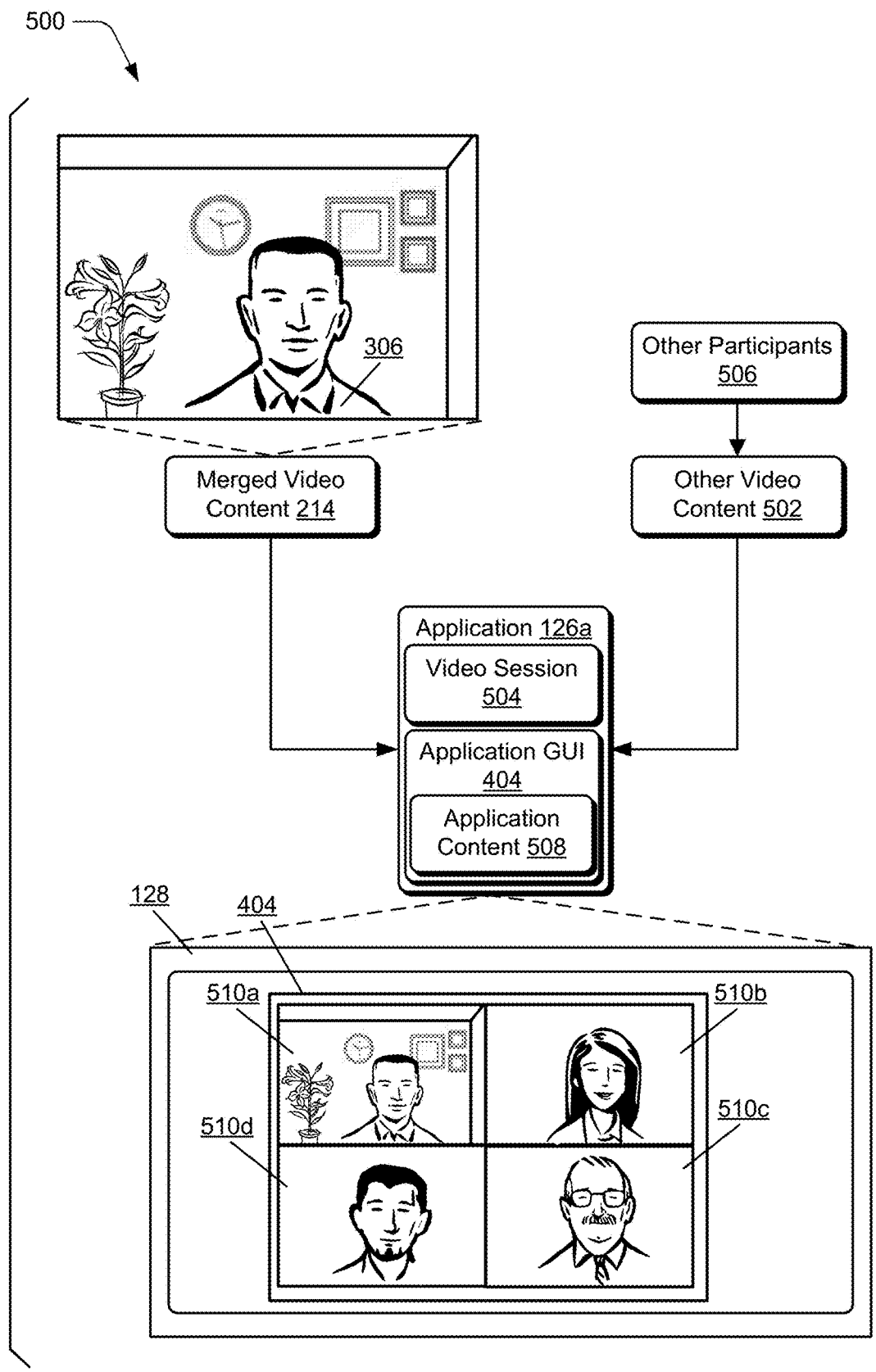
FIG. 5 depicts a scenario for utilizing merged video content as part of an application in accordance with one or more implementations.

FIG. 5 depicts a scenario 500 for utilizing merged video content as part of an application in accordance with one or more implementations. The scenario 500, for instance, represents a continuation of the scenarios 300, 400. In the scenario 500 the merged video content 214 is displayed along with other video content 502 within the application GUI 404 for the application 126a. The application GUI 404, for instance, is displayed on the display device 128 of the computing device 104 as part of executing the application 126a. The application 126a, for example, represents a communication application (e.g., a videoconference application), the merged video content 214 represents the user 306 as a participant in a video communication session ("video session") 504 implemented by the application 126a, and the other video content 502 represents other participants 506 in the video session 504. For instance, the other video content 502 represents different video feeds received from devices associated with the other participants 506.

Generally, the merged video content 214 and the other video content 502 are utilized as application content 508 that is displayed within the application GUI 404 as part of the video session 504. In this particular example the application content 508 includes a region 510a that is populated with the merged video content 214 and regions 510b, 510c, and 510d that are populated with the other video content 502.

Figure 6:
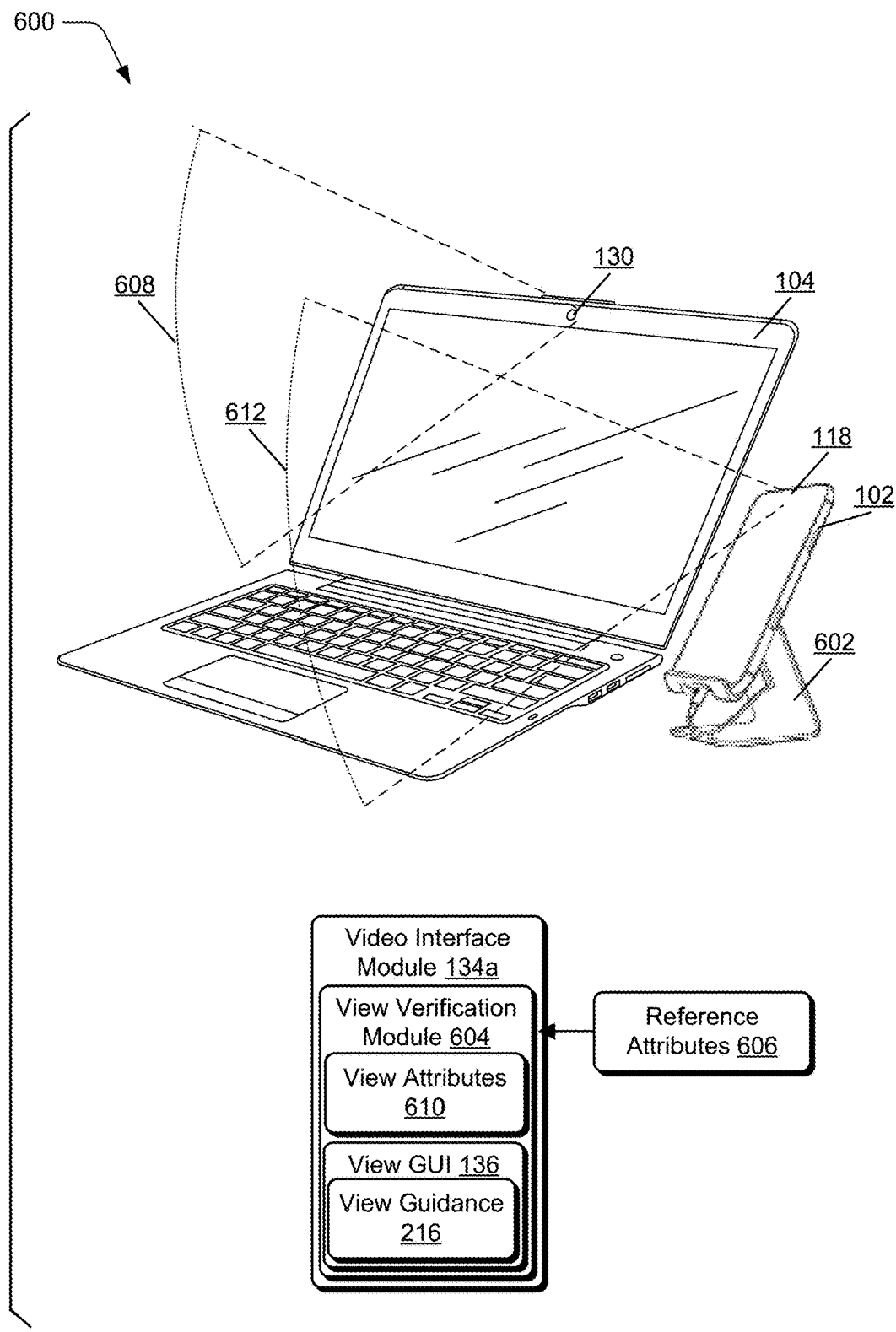
FIG. 6 depicts a scenario for adjusting a view angle of a video capture device in accordance with one or more implementations.

FIG. 6 depicts a scenario 600 for adjusting a view angle of a video capture device in accordance with one or more implementations. In at least one implementation the scenario 600 is performed to position the mobile device 102 for capturing video content that is mergeable with video content captured by the computing device. The scenario 600, for example, is implemented prior to and/or in conjunction with the scenarios 300-500. The scenario 600 includes the computing device 104 and the mobile device 102 positioned in proximity to one another, such as on a desk or other surface. Further, the mobile device 102 is positioned on a stand 602, such as a mobile docking station. Generally, the stand 602 enables the mobile device 102 to be moved between different positions relative to the computing device 104.

In the scenario 600 the video interface module 134a implements a view verification module 604 to enable the mobile device 102 to be positioned at a similar field of view with the computing device 104. Accordingly, the view verification module 604 receives reference attributes 606 which represent visual attributes of a field of view 608 captured by a camera 130 of the computing device 104. Generally, the reference attributes 606 include different visual-related data such as visual objects detected within the field of view 608, types of detected visual objects (e.g., a user, a background object type), relative distance between detected visual objects, size of detected visual objects (e.g., relative to one another), etc.

Further to the scenario 600 the view verification module 604 determines view attributes 610 which represent visual attributes of a field of view 612 captured by a camera 118 of the mobile device 102. Generally, the view attributes 610 include different visual-related data such as visual objects detected within the field of view 612, types of detected visual objects (e.g., a user, a background object type), relative distance between detected visual objects, size of detected visual objects (e.g., relative to one another), etc.

To enable the mobile device 102 to be properly positioned the view verification module 604 compares the view attributes 610 to the reference attributes 606 to determine a similarity between the field of view 612 and the field of view 608. Generally, the similarity between the fields of view can be determined in various ways, such as by comparing objects included in the respective fields of view, e.g., object shapes, object distances relative to one another, object types, object identifiers, and so forth. For instance, comparing the view attributes 610 to the reference attributes 606 enables the view verification module 604 to determine whether the field of view 612 of the mobile device 102 includes similar objects and object attributes of the field of view 608 of the computing device 104.

In implementations where the view attributes 610 substantially match the reference attributes 606, the view verification module 604 determines that the mobile device 102 is positioned properly to obtain video data for merging with video data from the computing device 104, e.g., to generate the merged video content 214. However, in implementations where the view attributes 610 do not substantially match the reference attributes 606, the view verification module 604 determines that the mobile device 102 is to be repositioned. Accordingly, the view verification module 604 generates the view guidance 216 and populates the view guidance 216 to the view GUI 136. Generally, the view guidance 216 includes instructions for enabling a user to reposition the mobile device 102 such that the field of view 612 substantially matches the field of view 608. Accordingly, based on the view guidance 216, a user manipulates a position of the mobile device 102 to cause the field of view 612 to substantially match the field of view 608.

Figure 7A:
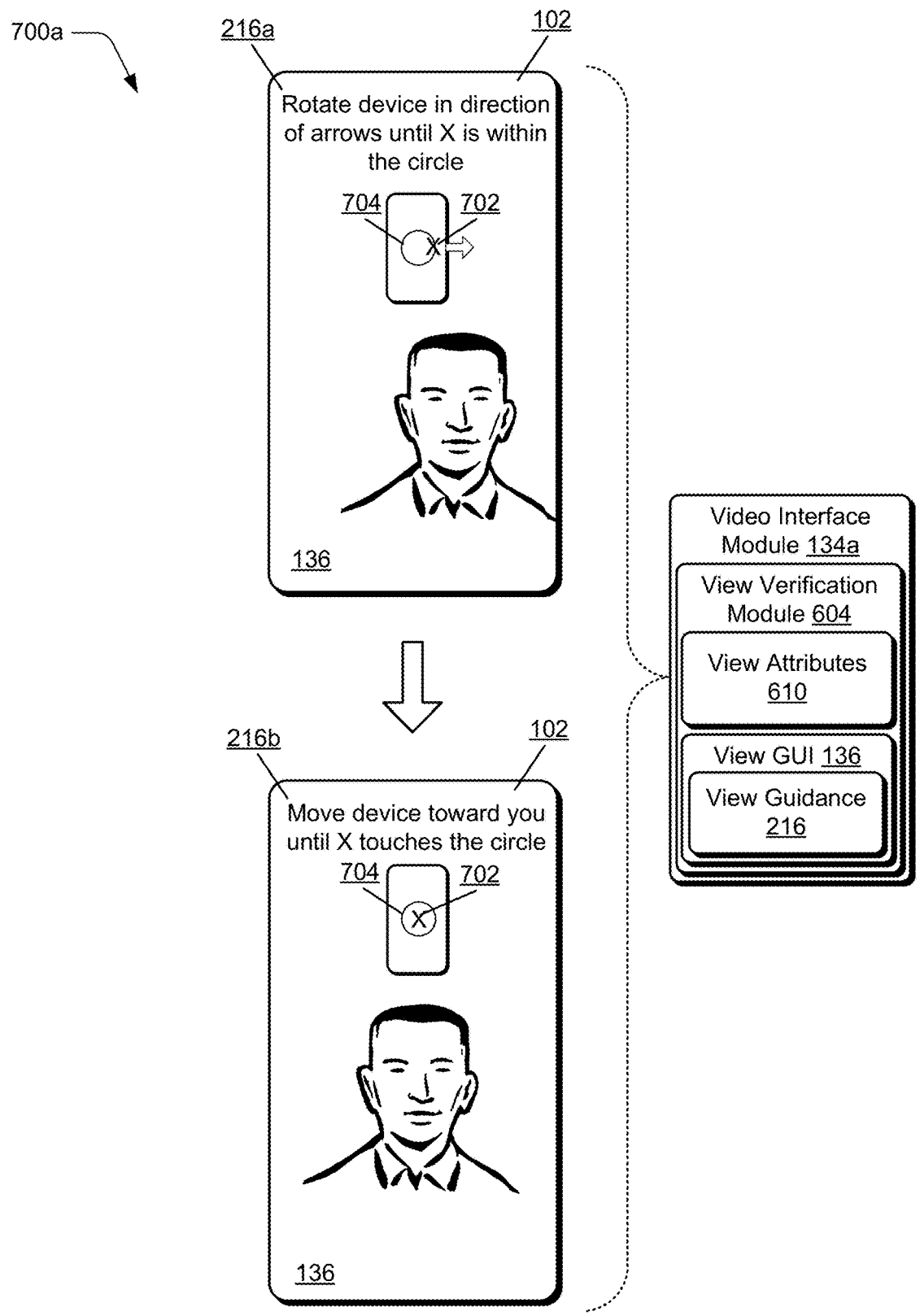
FIG. 7*a* depicts a scenario for providing a user with guidance for positioning a device to capture video content in accordance with one or more implementations.

FIG. 7a depicts a scenario 700a for providing a user with guidance for positioning a device to capture video content in accordance with one or more implementations. The scenario 700a, for instance, is implemented in conjunction with the scenario 600. Although not expressly depicted here consider that the mobile device 102 is positioned on a stand such as depicted in the scenario 600.

In the scenario 700a the view GUI 136 is presented with the view guidance 216 on the mobile device 102. For instance, in the upper portion of the scenario 700a view guidance 216a is presented that instructions a user to rotate the mobile device to cause a view indicator 702 (in this example an "X") to overlap with a view target 704. The view guidance 216a, for example, indicates direction of rotation guidance as part of the view guidance 216a. Accordingly, proceeding to the lower portion of the scenario 700a a user rotates the mobile device 102 such that the view indicator 702 overlaps (e.g., positionally coincides) with the view target 704. Accordingly, the view verification module 604 determines that the view indicator 702 overlaps the view target 704 and presents view guidance 216b that instructs a user to move the mobile device translationally, e.g., closer to the user. The view guidance 216b, for instance, instructs the user to move the mobile device 102 closer to the user until the view indicator 702 touches the view target 704, e.g., a perimeter of the view target 704.

Figure 7B:
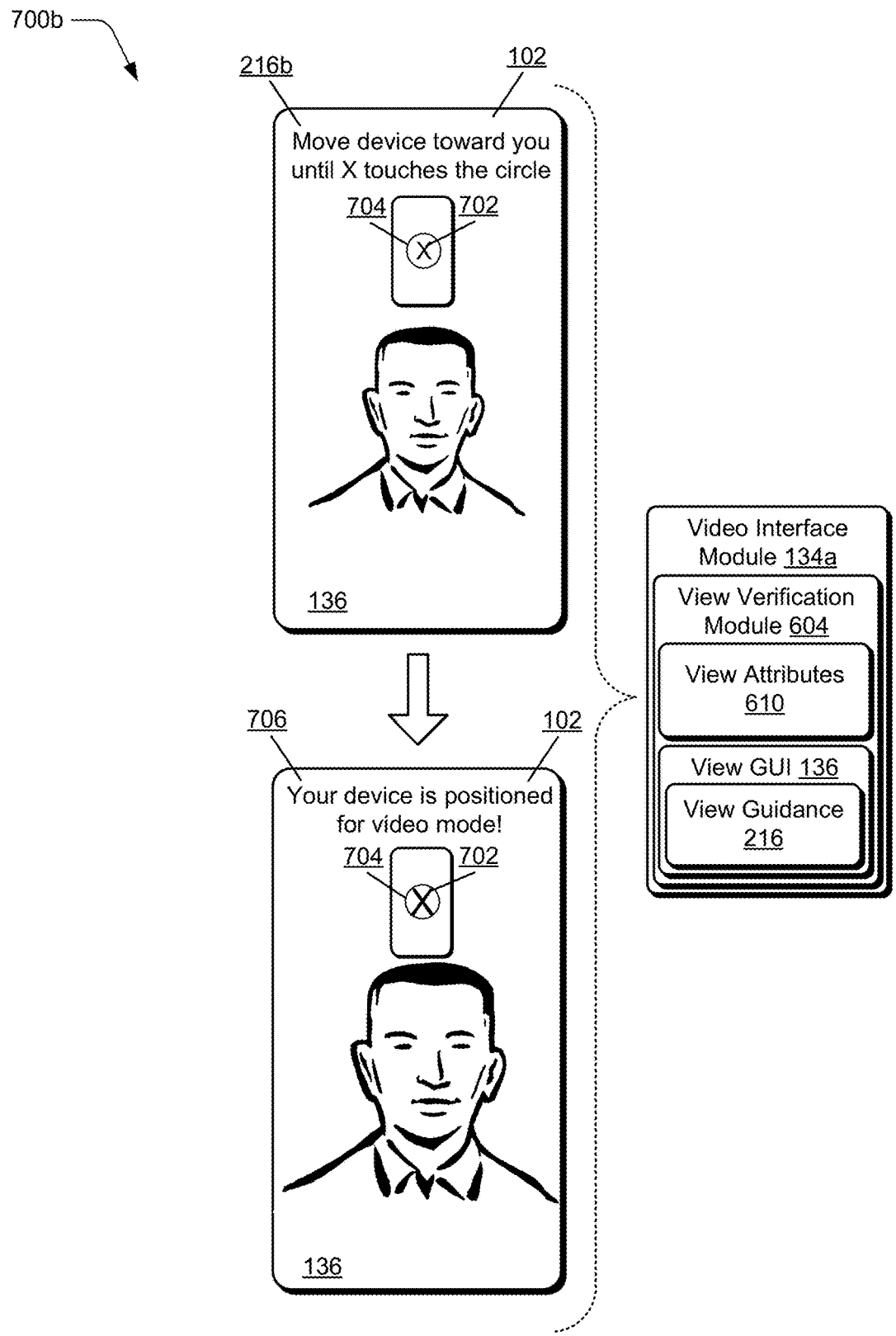
FIG. 7*b* depicts a scenario for providing a user with guidance for positioning a device to capture video content in accordance with one or more implementations.

FIG. 7b depicts a scenario 700b for providing a user with guidance for positioning a device to capture video content in accordance with one or more implementations. The scenario 700b, for instance, represents a continuation of the scenario 700a. In the upper portion of the scenario 700b the view guidance 216b is presented on the view GUI 136 such as described in the scenario 700a. Accordingly, proceeding to the lower portion of the scenario 700b, a user moves the mobile device 102 closer to the user which causes the view indicator 702 to touch the view target 704. For instance, as the user moves the mobile device 102 closer, the view indicator 702 expands until it contacts the perimeter of the view target 704. The view verification module 604 determines that the view indicator 702 touches the view target 704 and in response presents a position verification 706 indicating that the mobile device 102 is properly positioned to capture video content. For instance, with reference to the scenario 600, the view verification module 604 determines that the view attributes 610 for the mobile device 102 substantially match the reference attributes 606 from the computing device 104. Accordingly, video content captured by the mobile device is mergeable with video content captured by the computing device 104, such as described in the scenarios 300-500.

While the scenarios described above are discussed with reference to the view verification module 604 and the view guidance 216 being implemented via the mobile device 102, alternative or additional implementations provide view verification and/or view guidance via the computing device 104.

Figure 8:
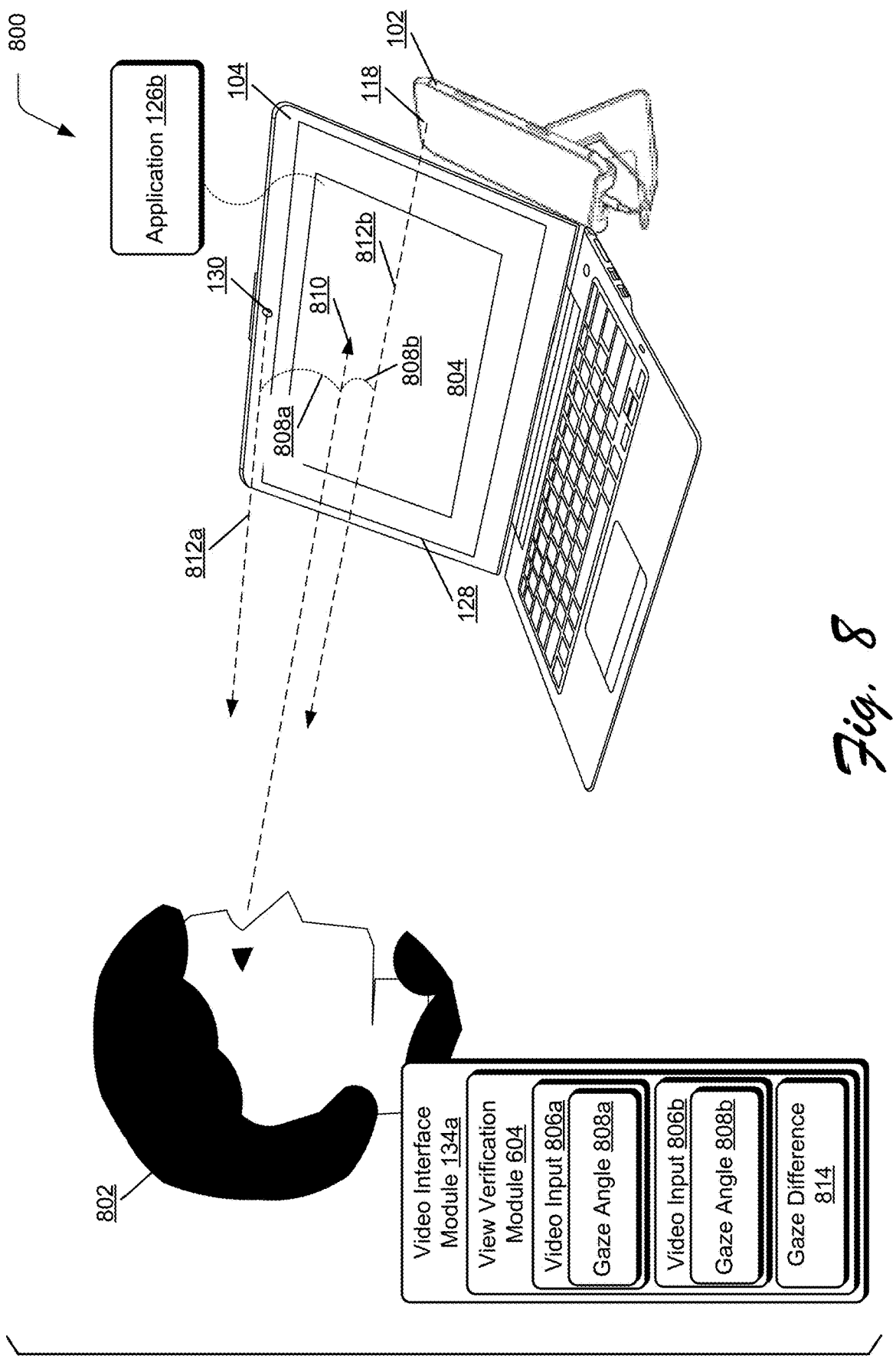
FIG. 8 depicts a scenario for determining a gaze angle of a user as part of capturing video content in accordance with one or more implementations.

FIG. 8 depicts a scenario 800 for determining a gaze angle of a user as part of capturing video content in accordance with one or more implementations. In the scenario 800 a user 802 is in proximity to the computing device 104 and the mobile device 102. Further, the user 802 is viewing the display device 128, such as part of interacting with a GUI 804 for an application 126b that is displayed on the display device 128. The application 126b, for instance, utilizes video content captured by the computing device 104 and/or the mobile device 102.

Further to the scenario 800, the view verification module 604 utilizes video input 806a from the camera 130 to determine a gaze angle 808a of the user 802 relative to the display device 128, and video input 806b from the camera 118 to determine a gaze angle 808b of the user 802 relative to the mobile device 102. For instance, the view verification module 604 utilizes the video input 806a from the camera 130 to determine a gaze vector 810 for the user 802. The gaze vector 810, for example, represents a gaze direction of the user 802 relative to the display device 128. In at least one implementation the view verification module 604 utilizes eye detection techniques to determine the gaze vector 810, such as by tracking a direction in which the user's eyes are viewing the display device 128. Accordingly, the gaze angle 808a represents an angular difference between the gaze vector 810 and an optical axis 812a of the camera 130. Further, the gaze angle 808b represents an angular difference between the gaze vector 810 and an optical axis 812b of the camera 118.

Further to the scenario 800 the view verification module 604 determines a gaze difference 814 between the gaze angle 808b and the gaze angle 808a. In at least one implementation the gaze difference 814 is compared to a threshold difference value of n degrees)(n° and if the gaze difference 814 is not greater than n°, the gaze of the user 802 relative to the mobile device 102 is determined to be substantially similar to the gaze of the user 802 relative to the computing device 104. Generally, any suitable value of n is definable such as 30°, 25°, 20°, etc.

According to various implementations, the gaze difference 814 is usable for various purposes. For instance, if the gaze difference 814 is larger than a threshold difference value, the view verification module 604 can provide the view guidance 216 to assist a user in adjusting a position of the mobile device 102 relative to the computing device 104 to bring the gaze difference 814 within the threshold difference value. In an alternative or additional implementation, if the gaze difference 814 is within the threshold difference value, video content captured by the mobile device 102 can be utilized for a video feed instead of merging video content from the computing device 104 and the mobile device 102. For instance, in a scenario where the gaze difference 814 is within a threshold difference, this may indicate that a user's gaze detected at the mobile device 102 is substantially similar to the user's gaze detected at the computing device 104. Thus, instead of merging content from different devices, video content captured at the mobile device 102 can be utilized without merging the video content with video content captured at the computing device 104. As mentioned previously, for example, in at least some implementations the camera 118 of the mobile device 102 is able to capture higher quality video than the camera 130 of the computing device 104, and thus utilizing the camera 118 as a video source can provide for high quality video content.

Figure 9:
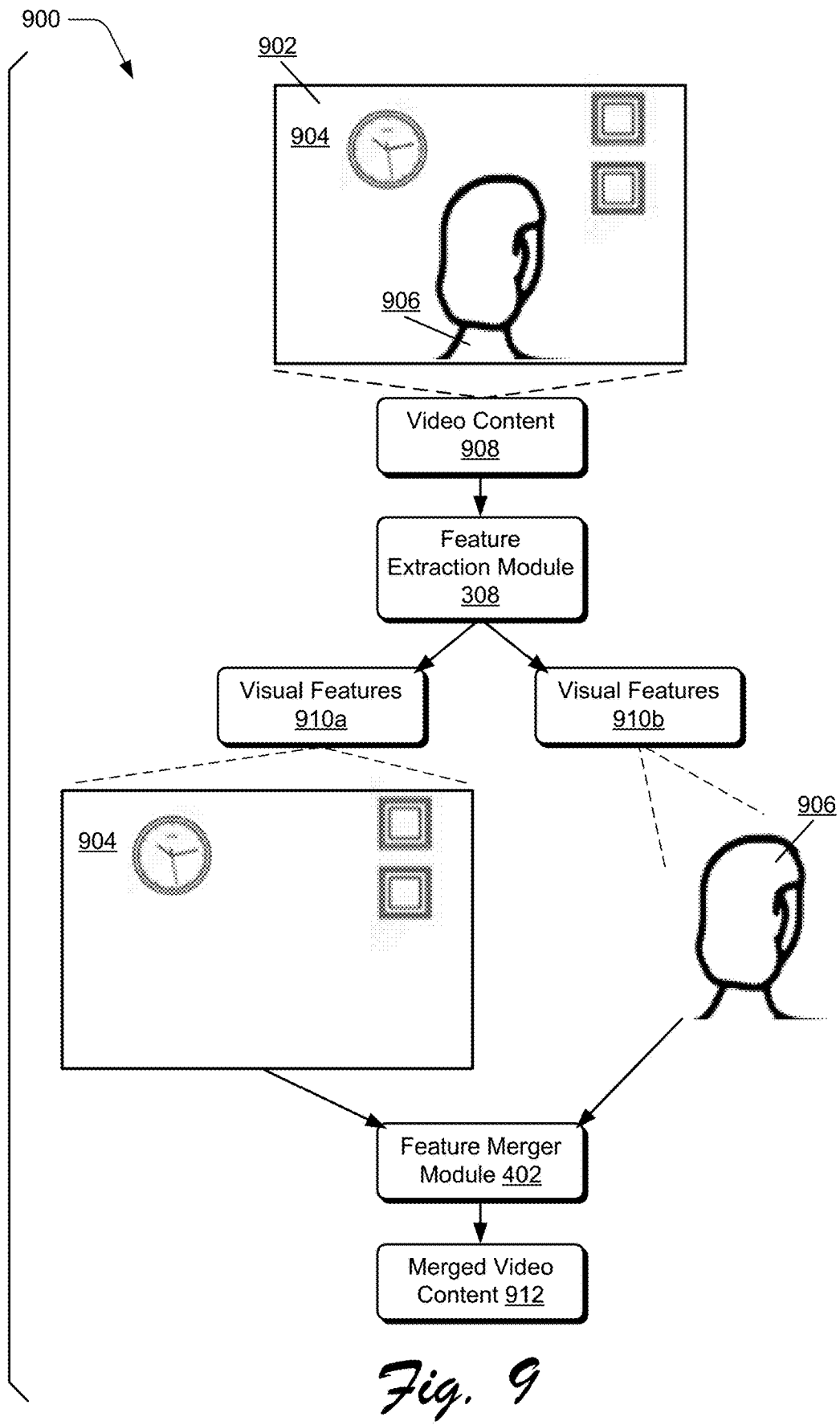
FIG. 9 depicts a scenario for recognizing and extracting visual features that include non-facial features of a user in accordance with one or more implementations.

FIG. 9 depicts a scenario 900 for recognizing and extracting visual features that include non-facial features of a user in accordance with one or more implementations. The scenario 900 depicts a scene 902 of a physical environment 904 in which a user 906 is positioned. Further, video content 908 is captured that includes video images of the scene 902. The video content 908, for instance, is captured by the mobile device 102 and/or the computing device 104. The video content 908 is processed by the feature extraction module 308 (such as described above) to extract visual features 910a and visual features 910b. In this particular example the visual features 910a include environmental (e.g., background) features of the physical environment 904 and the visual features 910b include visual features of the user 906. Notice in this particular example that the user 906 is facing away from a video capture perspective of the scene 902 such that only the back of the user's head is visible. Generally, this demonstrates that the feature extraction module 308 is able to recognize a variety of different human features, e.g., facial features as well as non-facial human features.

In at least one implementation the feature extraction module 308 leverages artificial intelligence (e.g., a machine learning algorithm and/or algorithms) to recognize and extract visual features from video content. A particular machine learning algorithm, for instance, is trained using training data consisting of a variety of different human features such as facial features and gaze features as well as other bodily features such as torsos, legs, full body features, human features from different perspectives (e.g., front, side, rear, etc.), human features in different positions (e.g., sitting, standing, moving, etc.), and so forth. Thus the feature extraction module 308 is able to utilize such a machine learning algorithm to recognize and extract from video content a variety of different human features in a variety of different positions.

Further to the scenario 900, the feature merger module 402 takes the visual features 910a, 910b as input and generates merged video content 912 that merges the visual features 910a, 910b into integrated video content. Generally, the merged video content 912 is usable for various purposes, such as for a video feed (e.g., a live video feed) for an application 126, for creating recorded video content, for generating still image captures from video, and so forth.

Figure 10:
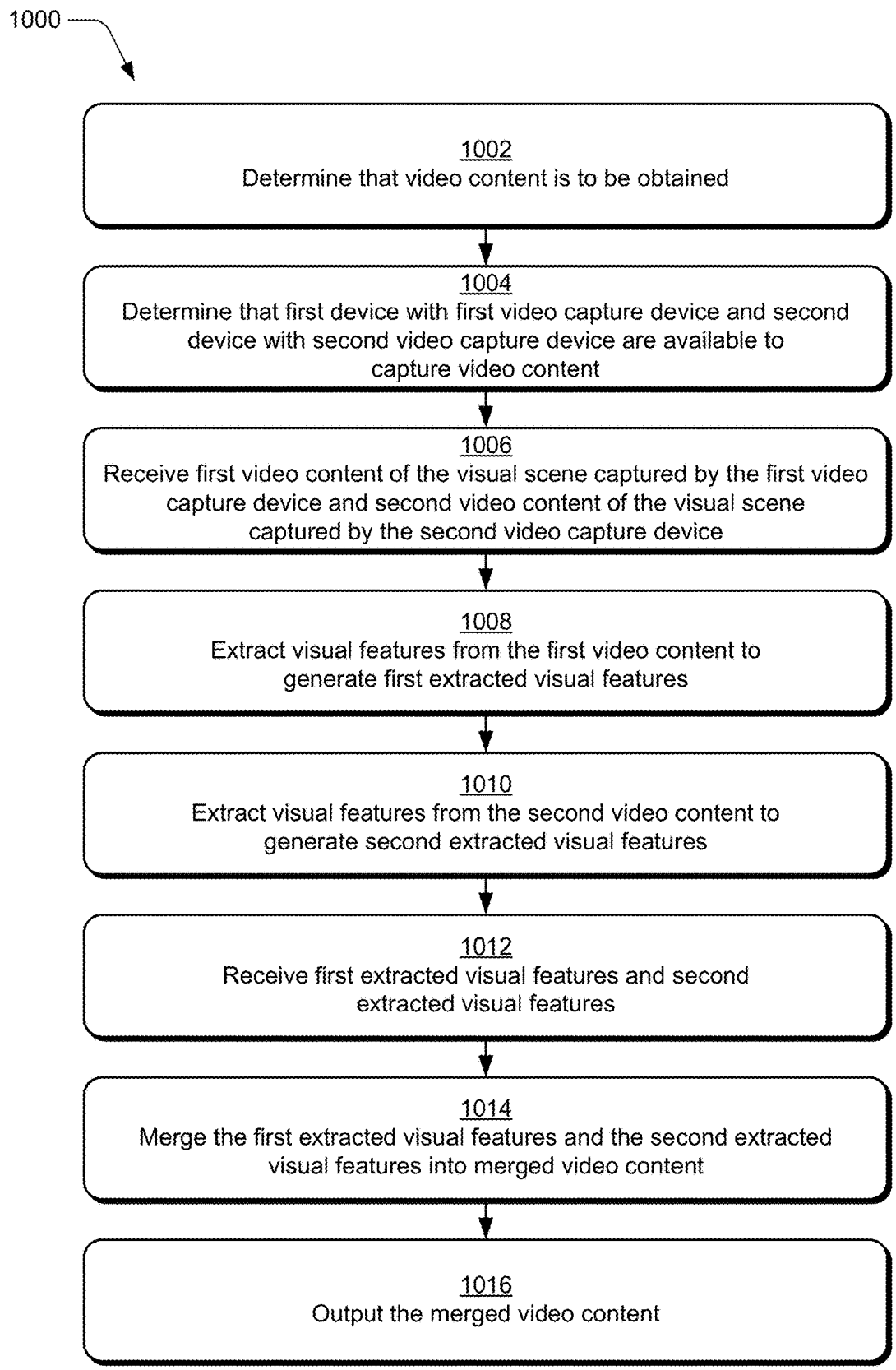
FIG. 10 illustrates an example method for merging video content from multiple devices in accordance with one or more implementations.

FIG. 10 illustrates an example method 1000 for merging video content from multiple devices in accordance with one or more implementations. At 1002 it is determined that video content is to be obtained. A particular application 126, for instance, requests video content, such as a live video content feed, a recorded segment of video content, and so forth.

At 1004 it is determined that a first device with a first video capture device and a second device with a second video capture device are available to capture video content of a visual scene. The visual scene, for instance, represents a physical environment, such as an environment in which a user of the computing device 104 and/or the mobile device 102 is positioned. The video interface module 134, for example, determines that a camera 118 of the mobile device and a camera 130 of the computing device are available to provide video content. Generally, the camera 118 has a video capture perspective that is independently manipulable relative to a video capture perspective of the camera 130. For instance, the mobile device 102 is positionable at multiple different orientations relative to the computing device 104 such that the camera 118 can assume a variety of different video capture perspectives relative to the camera 130. Generally, this enables the camera 118 to be positioned to capture video content of the visual scene that can be merged with video content captured of the visual scene by the camera 130, such as described throughout this disclosure.

At 1006 first video content of the visual scene captured by the first video capture device and second video content of the visual scene captured by the second video capture device are received. The mobile device 102, for instance, leverages the camera 118 to capture a first video stream of the visual scene and the computing device 104 leverages the camera 130 to capture a second video stream of the visual scene. In at least one implementation, in conjunction (e.g., prior to and/or during) capturing the first video content and the second video content, view adjustment guidance is provided to enable the mobile device 102 to be properly positioned to capture video content that is mergeable with video content captured by the computing device 104.

At 1008 visual features from the first video content are extracted to generate first extracted visual features. For instance, a subset of visual features from the first video content are extracted (e.g., isolated from) other visual features of the first video content. In the context of a visual scene that includes human features and background features, for example, the background features are extracted to isolate the background features from the human features.

At 1010 visual features are extracted from the second video content to generate second extracted visual features. For example, in the context of a visual scene that includes human features and background features, the human features are extracted to isolate the human features from the background features. At 1012 the first extracted visual features and the second extracted visual features are received. The first extracted visual features and the second extracted visual features, for instance, are received at the computing device 104 and/or the mobile device 102.

At 1014 the first extracted visual features and the second extracted visual features are merged into merged video content. The background features extracted from the first video content and human features extracted from the visual scene, for example, are merged into integrated video content, such as a single composited video stream. Generally, merging the extracted visual features can be performed in various ways, such as on a single device (e.g., the computing device 104 or the mobile device 102) or cooperatively between multiple devices, such as via cooperative communication and/or processing between the mobile device 102 and the computing device 104.

At 1016 the merged video content is output. A particular video interface module 134, for instance, outputs the merged video content, such as to an application 126. Alternatively or additionally the merged video content is output on a display device, such as the display device 128 of the computing device 104 and/or the display device 114 of the mobile device 102.

Figure 11:
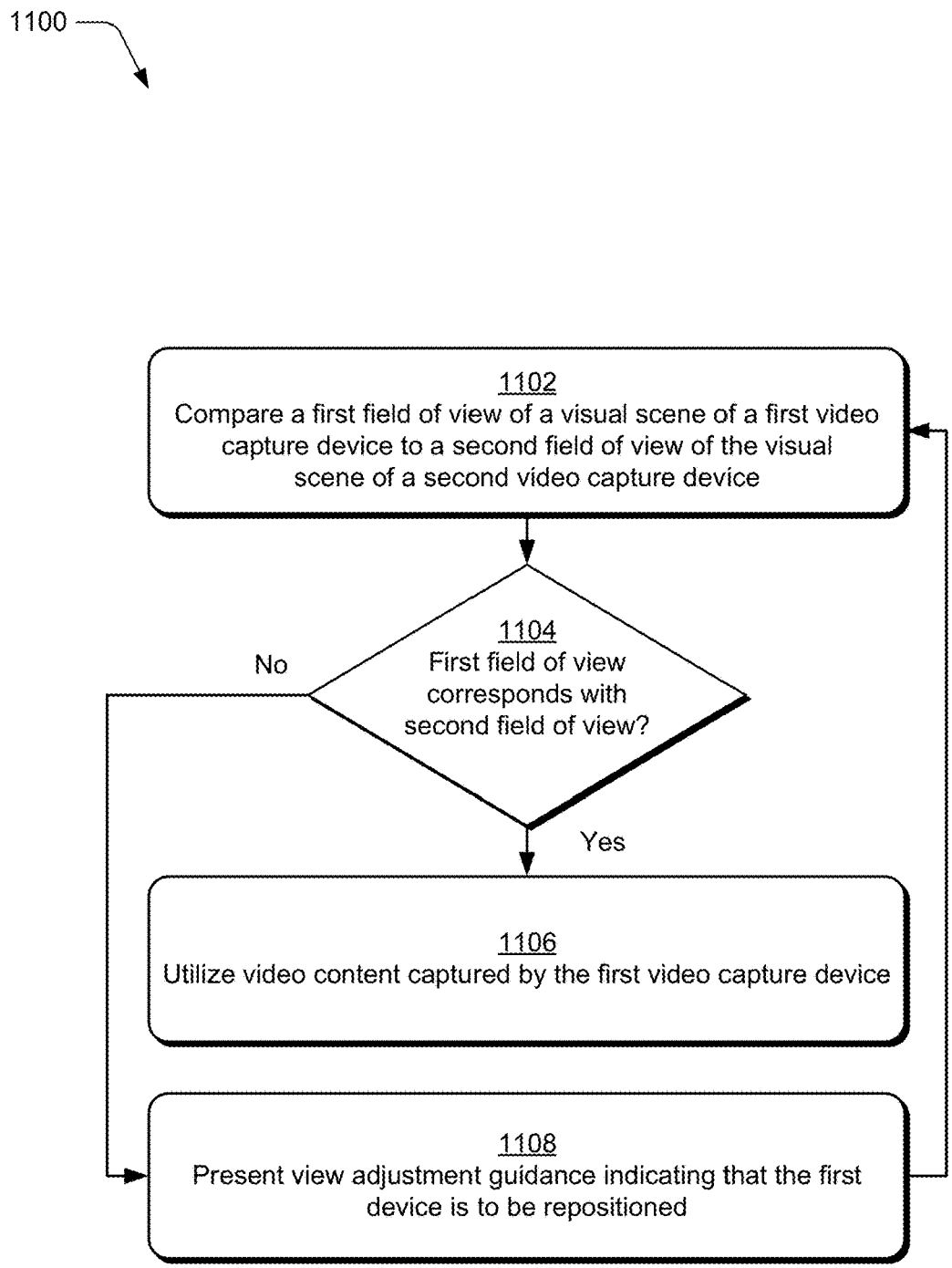
FIG. 11 illustrates an example method for enabling a device to be repositioned for capturing video content in accordance with one or more implementations.

FIG. 11 illustrates an example method 1100 for enabling a device to be repositioned for capturing video content in accordance with one or more implementations. The method 1100, for instance, is performed in conjunction with the method 1000. At 1102 a first field of view of a visual scene of a first video capture device is compared to a second field of view of the visual scene of a second video capture device. For instance, various view attributes of a visual scene captured by a camera 118 of the mobile device 102 are compared to view attributes of the visual scene captured by a camera 130 of the computing device 104. As discussed above, the view attributes can include various visual objects detected in the respective fields of view and positional and/or dimensional relationships of the visual objects. Alternatively or additionally, position information for the video capture devices is compared, such as 3-dimensional orientation (e.g., x, y, z orientation) of the video capture devices.

At 1104 it is determined whether the first field of view corresponds with the second field of view. For instance, the view verification module 604 determines whether visual objects detected within the second field of view are detected within the first field of view, whether spatial relationships between objects detected in the first field of view are substantially similar to spatial relationships between the same objects detected in the second field of view, whether object dimensional attributes (e.g., sizes) of visual objects detected in the first field of view are substantially similar to dimensional attributes of the same objects detected in the second field of view, and so forth. Alternatively or additionally the view verification module 604 determines whether position information for the mobile device 102 correlates to position information for the computing device 104, e.g., the mobile device 102 is approximately in the same position and orientation as the computing device 104.

If it is determined that the first field of view corresponds with the second field of view ("Yes"), at 1106 video content captured by the first video capture device is utilized. For instance, a first subset of visual features extracted from first video content captured via a camera 118 of the mobile device 102 is merged with a second subset of features extracted from second video content captured via a camera 130 of the computing device 104 to generate merged video content. Alternatively, in a scenario where a user gaze that meets certain criteria is detected in the video content captured by a camera 118 of the mobile device 102, the video content from the camera 118 can be utilized instead of merging the video content with video content captured by a camera 130. For instance, when a user gaze detected in first video content captured by a camera 118 substantially corresponds to a user gaze detected in second video content captured by a camera 130, the first video content can be utilized without merging the first video content with the second video content.

If it is determined that the first field of view does not correspond with the second field of view ("No"), at 1108 view adjustment guidance is presented indicating that the first device is to be repositioned. The view verification module 604, for example, presents a visual prompt that instructs a user to reposition the mobile device 102, such as rotate the mobile device 102, move the mobile device 102 translationally (e.g., forward, backward, sideways), tilt the mobile device 102, and so forth. The method then returns to step 1102. The view verification module 604, for example, monitors the fields of view of a camera 118 and a camera 130 and determines that whether a field of view of the camera 118 changes such that the field of view corresponds to a field of view of a camera 130, such as based on a repositioning of the mobile device 102 relative to the computing device 104.

Figure 12:
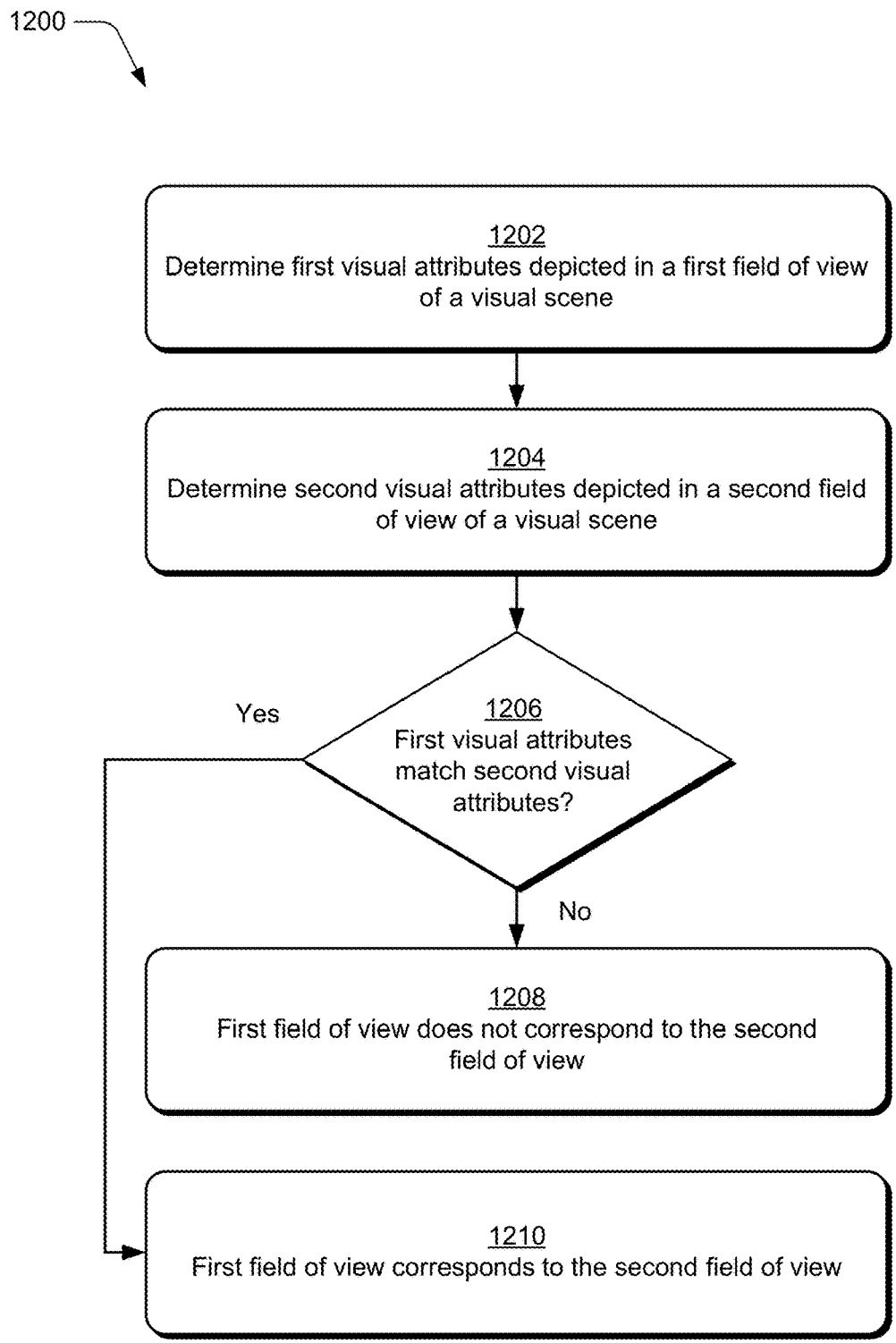
FIG. 12 illustrates an example method for determining whether a first field of view corresponds to a second field of view in accordance with one or more implementations.

FIG. 12 illustrates an example method 1200 for determining whether a first field of view corresponds to a second field of view in accordance with one or more implementations. The method 1200, for instance, provides an example way for performing step 1104 of the method 1100. At 1202 first visual attributes depicted in a first field of view of a visual scene are determined. The view verification module 604, for instance, identifies view attributes of video content captured by a camera 118 of the mobile device 102, such as visual objects detected in the video content and spatial and/or dimensional attributes of the visual objects.

At 1204 second visual attributes depicted in a second field of view of the visual scene are determined. The view verification module 604, for instance, identifies view attributes of video content captured by a camera 130 of the computing device 104, such as visual objects detected in the video content and spatial and/or dimensional attributes of the visual objects.

At 1206 the first visual attributes are compared with the second visual attributes to determine whether the first visual attributes substantially match the second visual attributes. The view verification module 604, for example, compares instances and attributes of objects detected in video content captured by a camera 130 to instances and attributes of objects detected in video content captured by a camera 118 of the mobile device 102 to determine whether the objects match, e.g., the same objects are detected, dimensions of objects are similar, distances between objects are similar, etc. If the first visual attributes do not substantially match the second visual attributes ("No"), at 1208 it is determined that the first field of view does not correspond to the second field of view. If the first visual attributes substantially match the second visual attributes ("Yes"), at 1210 it is determined that the first field of view corresponds to the second field of view. As described above, view guidance can be provided to enable a device to be repositioned to enable correspondence between fields of view.

Figure 13:
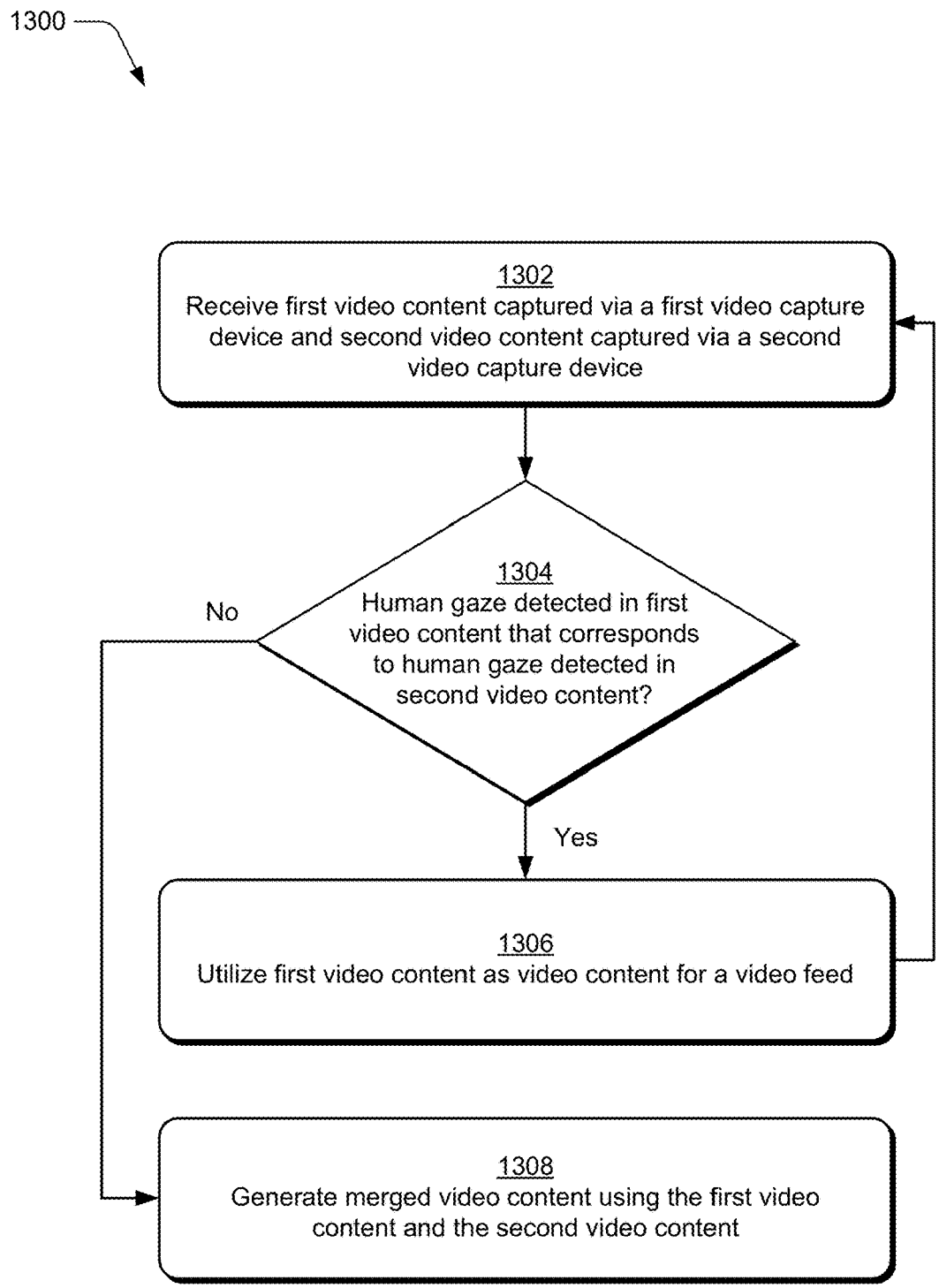
FIG. 13 illustrates an example method for determining how to utilize video content based on gaze detection in accordance with one or more implementations.

FIG. 13 illustrates an example method 1300 for determining how to utilize video content based on gaze detection in accordance with one or more implementations. At 1302 first video content captured via a first video capture device and second video content captured via a second video capture device are received. The first video content, for instance, is captured via a camera 118 of the mobile device 102 and the second video content is captured via a camera 130 of the computing device 104. In at least one implementation the first video content and the second video content capture representations of a visual scene.

At 1304 the first video content is inspected to determine whether a human gaze is detected in the first video content that substantially corresponds to a human gaze detected in second video content. The view verification module 604, for instance, processes the first video content and the second video content to determine if a human gaze is detected in the video content. Further, if a human gaze is detected in the first video content and the second video content, the view verification module 604 compares gaze attributes to determine if the human gaze detected in the first video content corresponds to the human gaze detected in the second video content. Generally, different gaze attributes can be considered, such as gaze angle, gaze direction, and so forth.

If a human gaze is detected in the first video content that substantially corresponds to a human gaze detected in second video content ("Yes"), at 1306 the first video content is utilized as video content for a video feed. The view verification module 604, for instance, determines that a human gaze detected in video content captured by the mobile device 102 corresponds to a human gaze captured by the mobile device 102. In such a scenario the content captured by the mobile device 102 can be utilized for video content, e.g., without utilizing video content captured by the computing device 104. In at least one implementation the method returns to step 1302 to monitor for human gaze attributes in the first video content. For instance, human gaze attributes may subsequently change such that the human gaze is no longer detected in the first video content that substantially corresponds to the human gaze detected in the second video content, and thus the decision at 1304 may change.

If a human gaze is not detected in the first video content that substantially corresponds to a human gaze detected in the second video content ("No"), at 1308 merged video content is generated using the first video content and the second video content. The view verification module 604, for instance, determines that a human gaze detected is not detected in video content captured by the mobile device 102 that corresponds to a human gaze captured by the mobile device 102. For example, no human gaze is detected in the first video content, or a human gaze is detected that does not correspond to a human gaze detected in the second video content. Accordingly, merged video content is generated utilizing a first subset of visual features extracted from the first video content and a second subset of visual features extracted from the second video.

Figure 14:
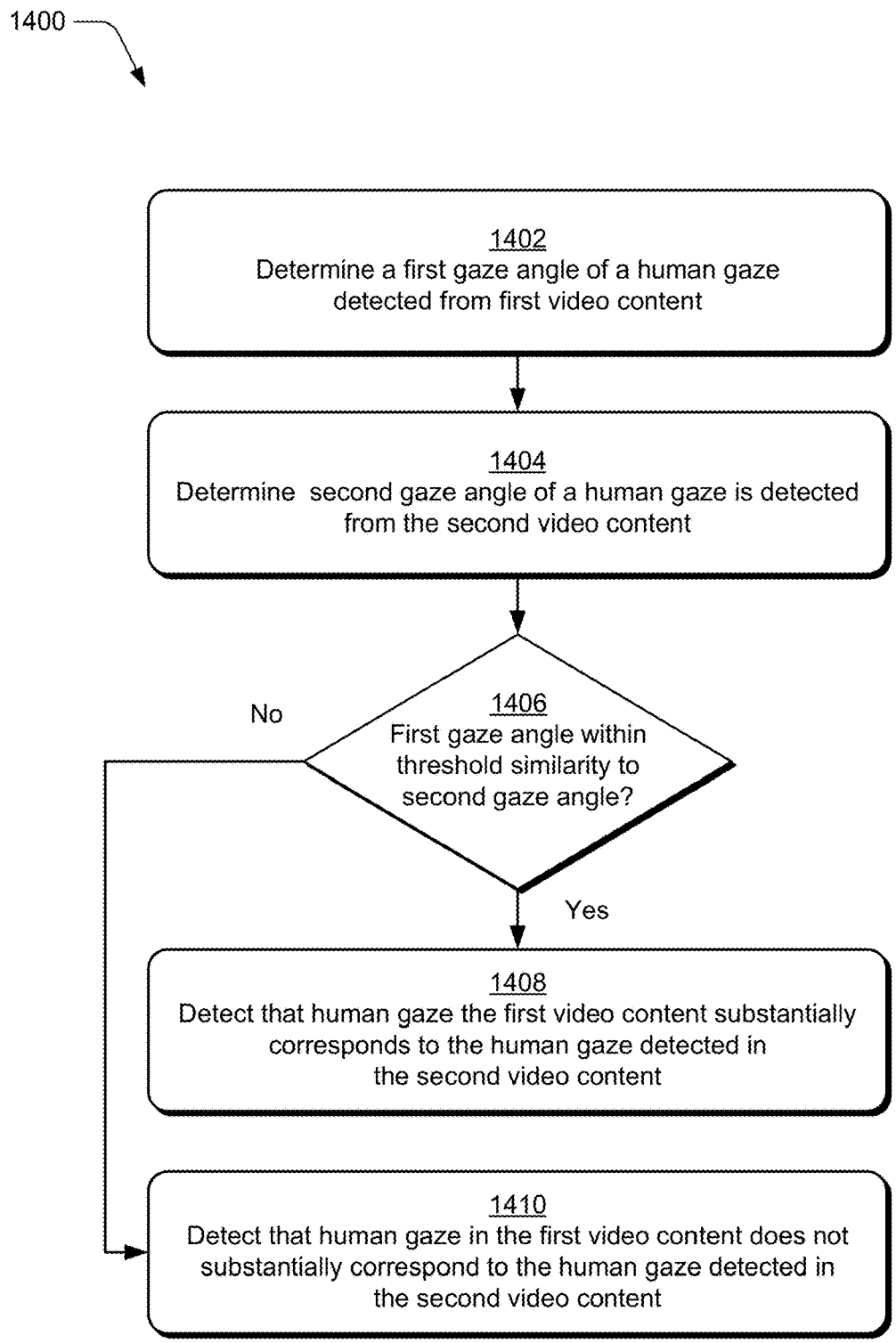
FIG. 14 illustrates an example method for determining whether a human gaze is detected in video content in accordance with one or more implementations.

FIG. 14 illustrates an example method 1400 for determining whether a human gaze is detected in video content in accordance with one or more implementations. The method 1400, for instance, represents an example implementation of step 1304 of the method 1300. At 1402 a first gaze angle of a human gaze detected from first video content is determined. The view verification module 604, for instance, detects a human gaze in video content captured by the mobile device 102 and determines a gaze angle of the human gaze relative to the mobile device 102. In at least one implementation the gaze angle is determined based on a gaze vector for the human gaze and an optical axis of a camera 118 of the mobile device 102.

At 1404 a second gaze angle of a human gaze from second video content is determined. The view verification module 604, for instance, detects a human gaze in video content captured by the computing device 104 and determines a gaze angle of the human gaze relative to the computing device 104. In at least one implementation the gaze angle is determined based on a gaze vector for the human gaze and an optical axis of a camera 130 of the computing device 104.

At 1406 the first gaze angle is compared to the second gaze angle to determine whether the first gaze angle is within a threshold similarity to the second gaze angle. As discussed above, for instance, a threshold gaze angle difference value is defined and thus a difference between the first gaze angle and the second gaze angle is compared to the threshold gaze angle difference. If the first gaze angle is within the threshold similarity to the second gaze angle ("Yes"), at 1408 the human gaze detected in the first video content substantially corresponds to the human gaze detected in the second video content. The view verification module 604, for instance, determines that the first gaze angle is no greater than the threshold gaze angle difference. If the first gaze angle is not within the threshold similarity to the second gaze angle ("No"), at 1410 the human gaze detected in the first video content does not substantially correspond to the human gaze detected in the second video content. The view verification module 604, for instance, determines that the first gaze angle is greater than the threshold gaze angle difference.

As discussed above, the determination of whether the first gaze angle substantially corresponds to the second gaze angle can be utilized to determine whether to merge video content from the mobile device 102 and the computing device 104, or whether to utilize video content from the mobile device 102 without merging it with video content from the computing device 104. Alternatively or additionally, if the first gaze angle is determined to not substantially correspond to the second gaze angle, view guidance can be provided to enable the mobile device 102 to be repositioned to provide correspondence between a human gaze captured by a camera 118 the mobile device 102 and a camera 130 the computing device 104.

Accordingly, implementations of video content based on multiple capture devices provide ways for utilizing multiple available video capture devices in different video capture scenarios.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 15:
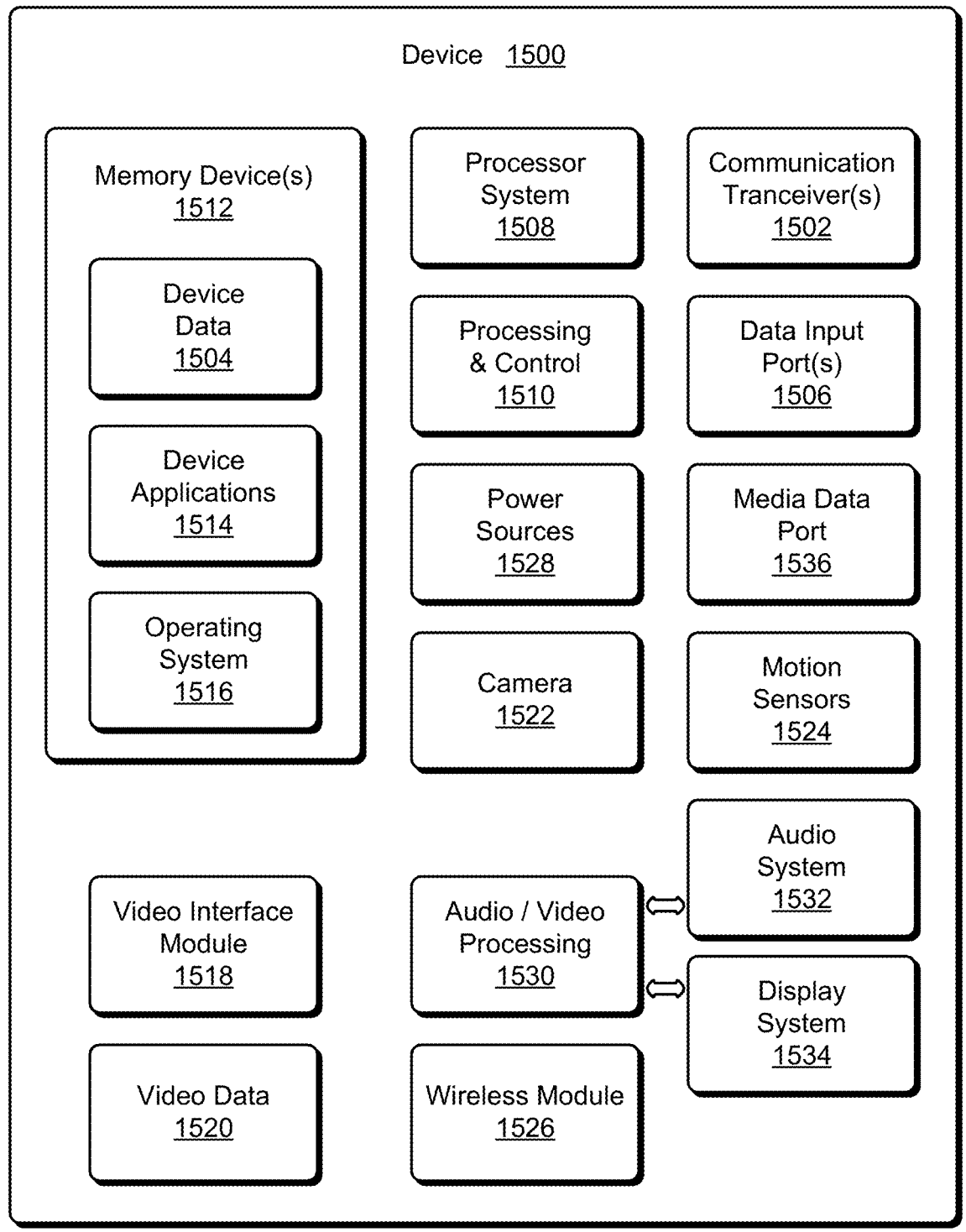
FIG. 15 illustrates various components of an example device in which aspects of video content based on multiple capture devices can be implemented.

FIG. 15 illustrates various components of an example device 1500 in which aspects of video content based on multiple capture devices can be implemented. The example device 1500 can be implemented as any of the devices described with reference to the previous FIGS. 1-14, such as any type of mobile device, mobile phone, mobile device, wearable device, tablet, computing, communication, entertainment, gaming, media playback, and/or other type of electronic device. For example, the mobile device 102 and/or the computing device 104 as shown and described with reference to FIGS. 1-14 may be implemented as the example device 1500. In a wearable device implementation, the device may include any one or combination of a watch, armband, wristband, bracelet, glove or pair of gloves, glasses, jewelry items, clothing items, any type of footwear or headwear, and/or other types of wearables.

The device 1500 includes communication transceivers 1502 that enable wired and/or wireless communication of device data 1504 with other devices. The device data 1504 can include any of device identifying data, device location data, wireless connectivity data, and wireless protocol data. Additionally, the device data 1504 can include any type of audio, video, and/or image data. Example communication transceivers 1502 include wireless personal area network (WPAN) radios compliant with various IEEE 1502.15 (Bluetooth™) standards, wireless local area network (WLAN) radios compliant with any of the various IEEE 1502.11 (Wi-Fi™) standards, wireless wide area network (WWAN) radios for cellular phone communication, wireless metropolitan area network (WMAN) radios compliant with various IEEE 1502.16 (WiMAX™) standards, and wired local area network (LAN) Ethernet transceivers for network data communication.

The device 1500 may also include one or more data input ports 1506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1500 includes a processing system 1508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1510. The device 1500 may further include any type of a system bus or other data and command transfer system that couples the various components within the device. A system bus can include any one or combination of different bus structures and architectures, as well as control and data lines.

The device 1500 also includes computer-readable storage memory 1512 (e.g., memory devices) that enable data storage, such as data storage devices that can be accessed by a computing device, and that provide persistent storage of data and executable instructions (e.g., software applications, programs, functions, and the like). Examples of the computer-readable storage memory 1512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1500 may also include a mass storage media device.

The computer-readable storage memory 1512 provides data storage mechanisms to store the device data 1504, other types of information and/or data, and various device applications 1514 (e.g., software applications). For example, an operating system 1516 can be maintained as software instructions with a memory device and executed by the processing system 1508. The device applications may also include a device manager, such as any form of a control application, software application, signal-processing and control module, code that is native to a particular device, a hardware abstraction layer for a particular device, and so on. Computer-readable storage memory 1512 represents media and/or devices that enable persistent and/or non-transitory storage of information in contrast to mere signal transmission, carrier waves, or signals per se. Computer-readable storage memory 1512 do not include signals per se or transitory signals.

In this example, the device 1500 includes a video interface module 1518 that implements aspects of video content based on multiple capture devices and may be implemented with hardware components and/or in software as one of the device applications 1514. In an example, the video interface module 1518 can be implemented as the video interface modules 134*a*, 134*b* described in detail above. In implementations, the video interface module 1518 may include independent processing, memory, and logic components as a computing and/or electronic device integrated with the device 1500. The device 1500 also includes video data 1520 for implementing aspects of video content based on multiple capture devices and may include data from and/or utilized by the video interface module 1518.

In this example, the example device 1500 also includes a camera 1522 and motion sensors 1524, such as may be implemented in an inertial measurement unit (IMU). The motion sensors 1524 can be implemented with various sensors, such as a gyroscope, an accelerometer, and/or other types of motion sensors to sense motion of the device. The various motion sensors 1524 may also be implemented as components of an inertial measurement unit in the device.

The device 1500 also includes a wireless module 1526, which is representative of functionality to perform various wireless communication tasks. For instance, for the mobile device 102 and/or the computing device 104, the wireless module 1526 can be leveraged to scan for and detect wireless networks, as well as negotiate wireless connectivity to wireless networks for the mobile device 102 and/or the computing device 104. The device 1500 can also include one or more power sources 1528, such as when the device is implemented as a mobile device. The power sources 1528 may include a charging and/or power system, and can be implemented as a flexible strip battery, a rechargeable battery, a charged super-capacitor, and/or any other type of active or passive power source.

The device 1500 also includes an audio and/or video processing system 1530 that generates audio data for an audio system 1532 and/or generates display data for a display system 1534. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1536. In implementations, the audio system and/or the display system are integrated components of the example device. Alternatively, the audio system and/or the display system are external, peripheral components to the example device.

Although implementations of video content based on multiple capture devices have been described in language specific to features and/or methods, the subject of the appended claims is not necessarily limited to the specific features or methods described. Rather, the features and methods are disclosed as example implementations of video content based on multiple capture devices, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a method, including: determining that a first device with a first video capture device and a second device with a second video capture device are available to capture video content of a visual scene; receiving first extracted visual features extracted from first video content captured by the first video capture device and second extracted visual features extracted from second video content captured by the second video capture device, the first extracted visual features including one or more background features from the visual scene and the second extracted visual features including one of more human features from the visual scene; and merging the first extracted visual features and the second extracted visual features into merged video content that includes the one or more background features extracted from the first video content and the one or more human features extracted from the visual scene.

In some aspects, the techniques described herein relate to a method, further including: inspecting the first video content captured via the first video capture device to determine whether a human gaze is detected in the first video content that substantially corresponds to a human gaze detected in the second video content; and determining that a human gaze is not detected in the first video content that substantially corresponds to a human gaze detected in the second video content, wherein the merging the first extracted visual features and the second extracted visual features into the merged video content is performed based on the determining that a human gaze is not detected in the first video content that substantially corresponds to a human gaze detected in the second video content.

In some aspects, the techniques described herein relate to a method, further including presenting view adjustment guidance on one or more of the first device or the second device indicating that the first device is to be repositioned for capturing the first video content.

In some aspects, the techniques described herein relate to a method, wherein the presenting the view adjustment guidance is performed in response to determining that a first field of view of the first device does not correspond with a second field of view of the second device, the method further including determining that the first device is repositioned such that the first field of view corresponds with the second field of view.

In some aspects, the techniques described herein relate to a method, wherein the presenting the view adjustment guidance includes presenting a visual prompt indicating a direction of movement of the first device to cause the first field of view to correspond with the second field of view.

In some aspects, the techniques described herein relate to a method, wherein the merging the first extracted visual features and the second extracted visual features into the merged video content includes overlaying the one or more human features over the one or more background features.

In some aspects, the techniques described herein relate to a method, further including adjusting one or more visual settings of one or more of the first video capture device or the second video capture device to cause one or more color attributes of the second extracted visual features to correspond to one or more color attributes of the first extracted visual features.

In some aspects, the techniques described herein relate to a method, wherein the one or more visual settings includes one or more of a white balance setting or a brightness setting.

In some aspects, the techniques described herein relate to a method, further including: utilizing the merged video content as a video feed; detecting that the one or more human features are not detected in further video content captured by the first video capture device and the second video capture device; and utilizing a video stream from the first video capture device for the video feed.

In some aspects, the techniques described herein relate to an apparatus including: a processing system implemented at least in part in hardware of the apparatus; and a video interface module implemented at least in part in hardware of the apparatus and executable by the processing system to: determine that a first device with a first video capture device and a second device with a second video capture device are available to capture video content of a visual scene; inspect first video content captured via the first video capture device to determine whether a human gaze is detected in the first video content that substantially corresponds to a human gaze detected in second video content captured by the second video capture device; determine, in an event that a human gaze is detected in the first video content that substantially corresponds to a human gaze detected in the second video content, to utilize the first video content as video content for a video feed; and determine, in an event that a human gaze is not detected in the first video content that substantially corresponds to a human gaze detected in the second video content, to generate merged video content utilizing a first subset of one or more visual features extracted from the first video content and a second subset of one or more visual features extracted from the second video content captured by the second video capture device, and to utilize the merged video content for the video feed.

In some aspects, the techniques described herein relate to a apparatus, wherein to determine whether a human gaze is detected in the first video content that substantially corresponds to a human gaze detected in the second video content includes to: determine a first gaze angle of a human gaze detected from the first video content; determine a second gaze angle of a human gaze detected from the second video content; compare the first gaze angle to the second gaze angle to determine whether the first gaze angle is within a threshold similarity to the second gaze angle, wherein: in an event that the first gaze angle is within the threshold similarity to the second gaze angle, the human gaze detected in the first video content substantially corresponds to the human gaze detected in the second video content; and in an event that the first gaze angle is not within the threshold similarity to the second gaze angle, the human gaze detected in the first video content does not substantially correspond to the human gaze detected in the second video content.

In some aspects, the techniques described herein relate to a apparatus, wherein the video interface module is implemented to determine that a human gaze is detected in the first video content that substantially corresponds to a human gaze detected in the second video content, and to utilize the first video content as video content for the video feed and to not utilize the second video content for the video feed.

In some aspects, the techniques described herein relate to a apparatus, wherein the first video content and the second video content capture representations of a visual scene, the video interface module is implemented to determine that a human gaze is not detected in the first video content that substantially corresponds to a human gaze detected in the second video content, and to generate the merged video content including to: extract the first subset of one or more visual features as one or more background features from the first video content; extract the second subset of one or more visual features as one or more human features from the second video content; and merge the one or more human features with the one or more background features to generate the merged video content.

In some aspects, the techniques described herein relate to a apparatus, wherein the video interface module is implemented to adjust one or more visual settings of the second video capture device to cause one or more color attributes of the extracted one or more background features to correspond to one or more color attributes of the extracted one or more human features.

In some aspects, the techniques described herein relate to a apparatus, wherein the video interface module is implemented to: determine that a human gaze is detected in the first video content that substantially corresponds to a human gaze detected in the second video content, and to utilize the first video content as video content for the video feed and to not utilize the second video content for the video feed; and determine subsequently that a human gaze is no longer detected in the first video content that substantially corresponds to a human gaze detected in the second video content, and to generate the merged video content utilizing the first subset of one or more visual features and the second subset of one or more visual features.

In some aspects, the techniques described herein relate to a system including: one or more processors; and one or more computer-readable storage media storing instructions that are executable by the one or more processors to: determine that a first device with a first video capture device and a second device with a second video capture device are available to capture video content of a visual scene; compare a first field of view of the visual scene of the first video capture device to a second field of view of the visual scene of the second video capture device to determine that the first field of view does not correspond to the second field of view; present view adjustment guidance indicating that the first device is to be repositioned; detect that the first device is repositioned such that the first field of view corresponds with the second field of view; and merge a first subset of one or more visual features extracted from first video content captured via the first video capture device with a second subset of one or more visual features extracted from second video content captured via the second video capture device to generate merged video content.

In some aspects, the techniques described herein relate to a system, wherein to compare the first field of view of the first capture device to the second field of view of the second video capture device includes to: determine one or more first visual attributes depicted in the first field of view of the visual scene; determine one or more second visual attributes depicted in the second field of view of the visual scene; and compare the one or more first visual attributes with the one or more second visual attributes to determine that the one or more first visual attributes do not substantially match the one or more second visual attributes such that the first field of view does not correspond to the second field of view.

In some aspects, the techniques described herein relate to a system, wherein the one or more second visual attributes include at least one of one or more human features or one or more non-human objects.

In some aspects, the techniques described herein relate to a system, wherein to present view adjustment guidance includes to present a visual prompt indicating a direction of movement of the first device to cause the first field of view to correspond with the second field of view.

In some aspects, the techniques described herein relate to a system, wherein the first subset of one or more visual features includes one or more background features from the visual scene and the second subset of one or more visual features includes one or more human features from the visual scene, and wherein to merge the first subset of one or more visual features with the second subset of one or more visual features includes to overlay the one or more human features on the one or more background features to generate the merged video content.

The invention claimed is:

1. A method, comprising:
determining that a first device with a first video capture device and a second device with a second video capture device are available to capture video content of a visual scene;
receiving first extracted visual features extracted from first video content captured by the first video capture device and second extracted visual features extracted from second video content captured by the second video capture device, the first extracted visual features including one or more background features from the visual scene and the second extracted visual features including one of more human features from the visual scene;
presenting view adjustment guidance on one or more of the first device or the second device indicating that the first device is to be repositioned for capturing the first video content; and
merging the first extracted visual features and the second extracted visual features into merged video content that includes the one or more background features extracted from the first video content and the one or more human features extracted from the visual scene.

2. The method of claim 1, further comprising:
inspecting the first video content captured via the first video capture device to determine whether a human gaze is detected in the first video content that substantially corresponds to a human gaze detected in the second video content; and
determining that a human gaze is not detected in the first video content that substantially corresponds to a human gaze detected in the second video content, wherein said merging the first extracted visual features and the second extracted visual features into the merged video content is performed based on said determining that a human gaze is not detected in the first video content that substantially corresponds to a human gaze detected in the second video content.

3. The method of claim 1, wherein said presenting the view adjustment guidance is performed in response to determining that a first field of view of the first device does not correspond with a second field of view of the second device, the method further comprising determining that the first device is repositioned such that the first field of view corresponds with the second field of view.

4. The method of claim 3, wherein said presenting the view adjustment guidance comprises presenting a visual prompt indicating a direction of movement of the first device to cause the first field of view to correspond with the second field of view.

5. The method of claim 1, wherein said merging the first extracted visual features and the second extracted visual features into the merged video content comprises overlaying the one or more human features over the one or more background features.

6. The method of claim 1, further comprising adjusting one or more visual settings of one or more of the first video capture device or the second video capture device to cause one or more color attributes of the second extracted visual features to correspond to one or more color attributes of the first extracted visual features.

7. The method of claim 6, wherein the one or more visual settings comprises one or more of a white balance setting or a brightness setting.

8. The method of claim 1, further comprising:
utilizing the merged video content as a video feed;
detecting that the one or more human features are not detected in further video content captured by the first video capture device and the second video capture device; and
utilizing a video stream from the first video capture device for the video feed.

9. An apparatus comprising:
a processing system implemented at least in part in hardware of the apparatus; and
a memory storing instructions that are executable by the processing system to:
   determine that a first device with a first video capture device and a second device with a second video capture device are available to capture video content of a visual scene;
   inspect first video content captured via the first video capture device to determine whether a human gaze is detected in the first video content that substantially corresponds to a human gaze detected in second video content captured by the second video capture device;
   determine, in an event that a human gaze is detected in the first video content that substantially corresponds to a human gaze detected in the second video content, to utilize the first video content as video content for a video feed; and
   determine, in an event that a human gaze is not detected in the first video content that substantially corresponds to a human gaze detected in the second video content, to generate merged video content utilizing a first subset of one or more visual features extracted from the first video content and a second subset of one or more visual features extracted from the second video content captured by the second video capture device, and to utilize the merged video content for the video feed.

10. The apparatus of claim 9, wherein to determine whether a human gaze is detected in the first video content that substantially corresponds to a human gaze detected in the second video content comprises to:
   determine a first gaze angle of a human gaze detected from the first video content;
   determine a second gaze angle of a human gaze detected from the second video content; and
   compare the first gaze angle to the second gaze angle to determine whether the first gaze angle is within a threshold similarity to the second gaze angle, wherein:
      in an event that the first gaze angle is within the threshold similarity to the second gaze angle, the human gaze detected in the first video content substantially corresponds to the human gaze detected in the second video content; and
      in an event that the first gaze angle is not within the threshold similarity to the second gaze angle, the human gaze detected in the first video content does not substantially correspond to the human gaze detected in the second video content.

11. The apparatus of claim 9, wherein the instructions are further executable by the processing system to determine that a human gaze is detected in the first video content that substantially corresponds to a human gaze detected in the second video content, and to utilize the first video content as video content for the video feed and to not utilize the second video content for the video feed.

12. The apparatus of claim 9, wherein the first video content and the second video content capture representations of a visual scene, the instructions are further executable by the processing system to determine that a human gaze is not detected in the first video content that substantially corresponds to a human gaze detected in the second video content, and to generate the merged video content comprises to:
   extract the first subset of one or more visual features as one or more background features from the first video content;
   extract the second subset of one or more visual features as one or more human features from the second video content; and
   merge the one or more human features with the one or more background features to generate the merged video content.

13. The apparatus of claim 12, wherein the instructions are further executable by the processing system to adjust one or more visual settings of the second video capture device to cause one or more color attributes of the extracted one or more background features to correspond to one or more color attributes of the extracted one or more human features.

14. The apparatus of claim 9, wherein the instructions are further executable by the processing system to:
   determine that a human gaze is detected in the first video content that substantially corresponds to a human gaze detected in the second video content, and to utilize the first video content as video content for the video feed and to not utilize the second video content for the video feed; and
   determine subsequently that a human gaze is no longer detected in the first video content that substantially corresponds to a human gaze detected in the second video content, and to generate the merged video content utilizing the first subset of one or more visual features and the second subset of one or more visual features.

15. The apparatus of claim 9, wherein the instructions are further executable by the processing system to present view adjustment guidance on one or more of the first device or the second device indicating that the first device is to be repositioned for capturing the first video content.

16. A system comprising:
one or more processors; and
one or more computer-readable storage media storing instructions that are executable by the one or more processors to:
   determine that a first device with a first video capture device and a second device with a second video capture device are available to capture video content of a visual scene;
   compare a first field of view of the visual scene of the first video capture device to a second field of view of the visual scene of the second video capture device to determine that the first field of view does not correspond to the second field of view;
   present view adjustment guidance indicating that the first device is to be repositioned;
   detect that the first device is repositioned such that the first field of view corresponds with the second field of view; and
   merge a first subset of one or more visual features extracted from first video content captured via the first video capture device with a second subset of one or more visual features extracted from second video content captured via the second video capture device to generate merged video content.

17. The system of claim 16, wherein to compare the first field of view of the first capture device to the second field of view of the second video capture device comprises to:
- determine one or more first visual attributes depicted in the first field of view of the visual scene;
- determine one or more second visual attributes depicted in the second field of view of the visual scene; and
- compare the one or more first visual attributes with the one or more second visual attributes to determine that the one or more first visual attributes do not substantially match the one or more second visual attributes such that the first field of view does not correspond to the second field of view.

18. The system of claim 17, wherein the one or more second visual attributes comprise at least one of one or more human features or one or more non-human objects.

19. The system of claim 16, wherein to present view adjustment guidance comprises to present a visual prompt indicating a direction of movement of the first device to cause the first field of view to correspond with the second field of view.

20. The system of claim 16, wherein the first subset of one or more visual features comprises one or more background features from the visual scene and the second subset of one or more visual features comprises one or more human features from the visual scene, and wherein to merge the first subset of one or more visual features with the second subset of one or more visual features comprises to overlay the one or more human features on the one or more background features to generate the merged video content.

* * * * *